US008437387B2

(12) United States Patent
Currivan et al.

(10) Patent No.: US 8,437,387 B2
(45) Date of Patent: *May 7, 2013

(54) ASYMMETRIC MULTI-CHANNEL ADAPTIVE EQUALIZER

(75) Inventors: Bruce J. Currivan, Dove Canyon, CA (US); Loke Kun Tan, Newport Coast, CA (US); Thomas Joseph Kolze, Phoenix, AZ (US); Hanli Zou, Rancho Santa Margarita, CA (US); Lin He, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/439,197

(22) Filed: Apr. 4, 2012

(65) Prior Publication Data

US 2012/0189046 A1 Jul. 26, 2012

Related U.S. Application Data

(63) Continuation of application No. 13/020,503, filed on Feb. 3, 2011, now Pat. No. 8,160,127, which is a continuation of application No. 11/878,224, filed on Jul. 23, 2007, now Pat. No. 7,885,323.

(60) Provisional application No. 60/898,993, filed on Feb. 2, 2007.

(51) Int. Cl.
*H03H 7/30* (2006.01)
(52) U.S. Cl.
USPC ........... 375/232; 375/222; 375/140; 375/130; 375/231; 375/229; 348/607; 348/659
(58) Field of Classification Search .................. 375/323, 375/233
See application file for complete search history.

(56) References Cited

U.S. PATENT DOCUMENTS

| | | |
|---|---|---|
| 6,829,296 B1 | 12/2004 | Troulis et al. |
| 6,958,782 B2 | 10/2005 | Kishi |
| 7,120,123 B1 | 10/2006 | Quigley et al. |
| 7,215,700 B2 | 5/2007 | Currivan et al. |
| 7,333,528 B1 | 2/2008 | Miao |
| 7,639,738 B2 | 12/2009 | Lopez de Victoria |
| 7,885,323 B2 | 2/2011 | Currivan et al. |
| 2004/0213337 A1 | 10/2004 | Li et al. |
| 2005/0053127 A1 | 3/2005 | Shiue et al. |

(Continued)

OTHER PUBLICATIONS

Godard, D.N., "Self-Recovering Equalization and Carrier Tracking in Two-Dimensional Data Communication Systems," IEEE Transactions on Communications, vol. COM-28, No. 11, pp. 1867-1875 (Nov. 1980).

(Continued)

*Primary Examiner* — Eva Puente
(74) *Attorney, Agent, or Firm* — Sterne, Kessler, Goldstein & Fox P.L.L.C.

(57) ABSTRACT

An apparatus is disclosed to compensate for non-linear effects resulting from the transmitter, the receiver, and/or the communication channel in a communication system. A receiver of the communication system contains an image cancellation module that compensates for images generated during the modulation and/or demodulation process. The image cancellation module includes a fine carrier correction loop to correct for frequency offsets between the transmitter and receiver. The image cancellation module includes a coarse acquisition mode and a decision directed mode. The decision directed mode allows for a larger signal-to-noise ratio for the receiver when compared against the coarse acquisition mode.

20 Claims, 13 Drawing Sheets

U.S. PATENT DOCUMENTS

2009/0245448 A1   10/2009   Ran et al.
2010/0111141 A1    5/2010   Currivan et al.
2010/0135372 A1    6/2010   Agazzi et al.

OTHER PUBLICATIONS

Treichler, J.R. and Agee, B.G., "A New Approach to Multipath Correction of Constant Modulus sgnals," IEEE Transaction on Acoustics, Speech, and Signal Processing, vol. ASSP-31, No. 2, pp. 459-471 (Apr. 1983).

Valkama, M. et al.,"On the Performance of Interference Cancellar Based I/Q Imbalance Compensation," IEEE International Conference on Acoustics, Speech, and Singal Processing, vol. 5, pp. 2885-2888 (Jun. 5-9, 2000).

Widrow, B. and Stearns, S.D., Adaptive Singal Processing, ISBN No. 0-13-004029-0, pp. 302-367 (1985).

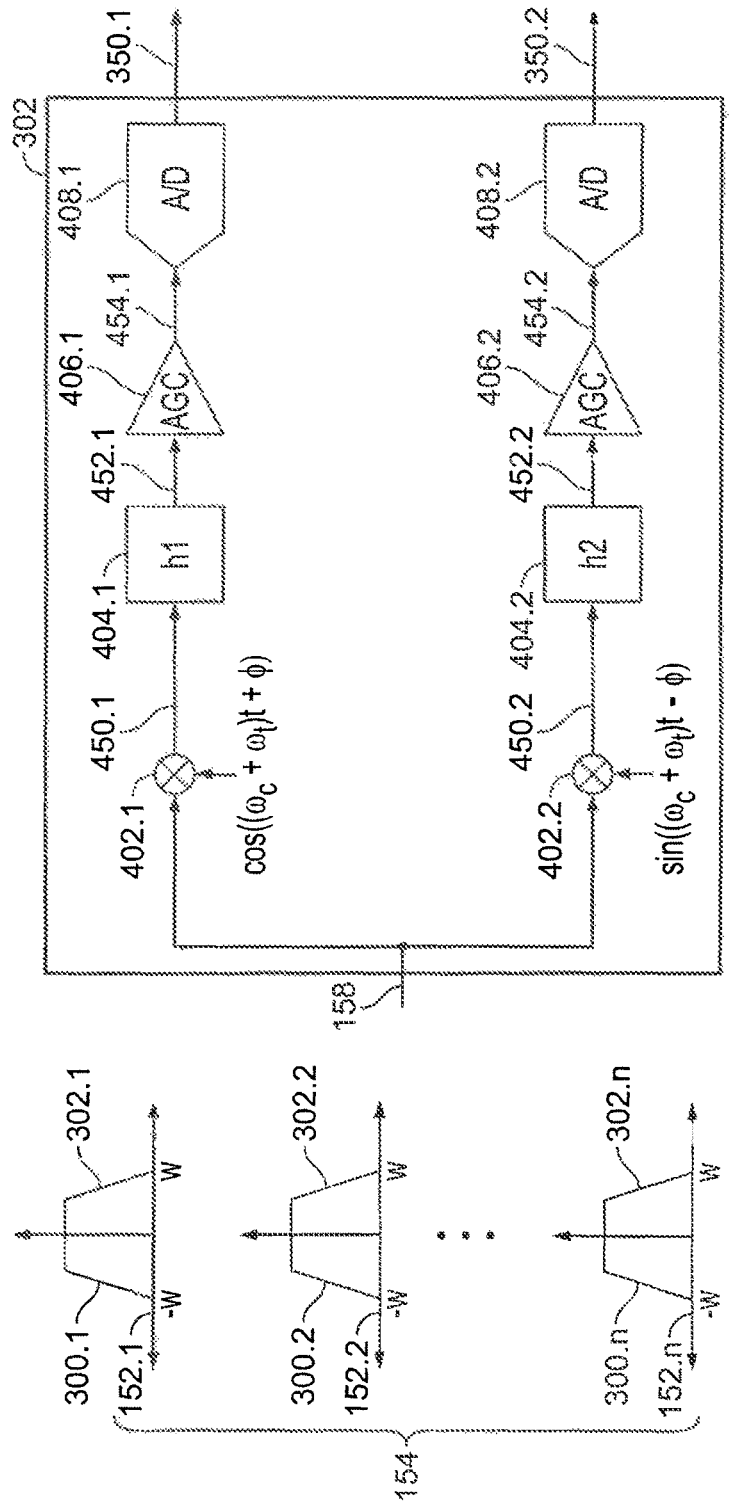

ASYMMETRIC MULTI-CHANNEL ADAPTIVE EQUALIZER

CROSS REFERENCE TO RELATED APPLICATIONS

This patent application is a continuation of U.S. patent application Ser. No. 13/020,503, filed Feb. 3, 2011, now U.S. Pat. No: 8,160,127, which is a continuation of U.S. patent application Ser. No. 11/878,224, filed Jul. 23, 2007, now U.S. Pat. No. 7,885,323, which claims the benefit of U.S. Provisional Patent Application No. 60/898,993, filed Feb. 2, 2007, each of which is incorporated herein by reference in its entirety.

FIELD OF THE INVENTION

The present invention relates generally to adaptive equalizers and specifically to using an image cancellation circuit to cancel images generated during the modulation and/or demodulation process.

BACKGROUND

A digital communication system typically involves transmitting a modulated data stream from a transmitter to a receiver over a communication channel. The communication channel can include a microwave radio link, a satellite channel, a fiber optic cable, or a copper cable to provide some examples. A communication channel contains a propagation medium that the modulated data stream passes through before reception by the receiver.

The propagation medium of the communication channel introduces distortion into the transmitted modulated data stream causing a received modulated data stream to differ from the transmitted modulated data stream. Noise, signal strength variations known as fading, phase shift variations, or multiple path delays known as multi-path propagation can introduce distortion into the transmitted modulated data stream. For example, transmission over a multiplicity of paths of different and variable lengths, or rapidly varying delays in the propagation medium from the transmitter to the receiver, may cause a change in the amplitude and/or phase of the transmitted modulated data stream.

Digital communication systems use an adjustable filter in the form of an equalizer to reduce the effect of the distortion caused by the communication channel. A receiver may directly set equalization filter coefficients for known or measured communication channels. However, in most situations the characteristics of the communication channel are not known in advance and therefore require the use of an adaptive equalizer. Adaptive equalizers derive adjustable filter coefficients from a received demodulated data stream.

A symmetric or a complex adaptive equalizer is an equalizer whereby the received demodulated data stream may be represented as complex samples. Each complex sample includes a real component and an imaginary component. The output of the complex adaptive equalizer is also complex with a real component and an imaginary component. The imaginary component and the real component of the equalized output are determined by combining a multiplication between a delayed version of the received demodulated data stream and adjustable filter coefficients of the equalizer. This complex multiplication requires two complex multiplications and one real addition for each component of the equalized output for a total of four real multiplications and two real additions.

One way of understanding the complex multiplication in conventional equalization techniques is to express it as a constrained two by two real matrix multiplication. The corresponding matrix used to perform the multiplication is a two by two matrix containing four real numbers. In a symmetric complex equalizer, this matrix may be constrained such that the diagonal elements are equal and the off-diagonal elements are the negatives of each other to provide an example.

However, an asymmetric equalizer may relax the constraints of the two by two matrix by replacing the complex multiplication may with a general two by two real matrix multiplication. The asymmetric equalizer implements the two by two matrix using any four real numbers. The symmetric equalizer may reduce the effect of the distortion caused by the communication channel so long as the characteristics of the communication system are linear. However, in practice, some effects of the communication channel as well as distortion caused by the transmitter and/or receiver are not linear. For example, in a multi-channel communication signal, residual signals resulting from a frequency-inverted duplicate or mirror image of a corresponding signal of interest or one or more neighboring information channels within the multi-channel information signal are some examples of non-linear effects requiring the use of an asymmetric equalizer.

Therefore, what is needed is an adaptive equalizer that is capable of compensating for the non-linear effects resulting: from the transmitter, the receiver, and/or the communication channel in a communication system.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

FIG. 3D is an illustration of a multi-channel information channel according to an exemplary embodiment of the present invention.

FIG. 4 is an illustration of a direct conversion tuner according to an exemplary embodiment of the present invention.

Figure 1:
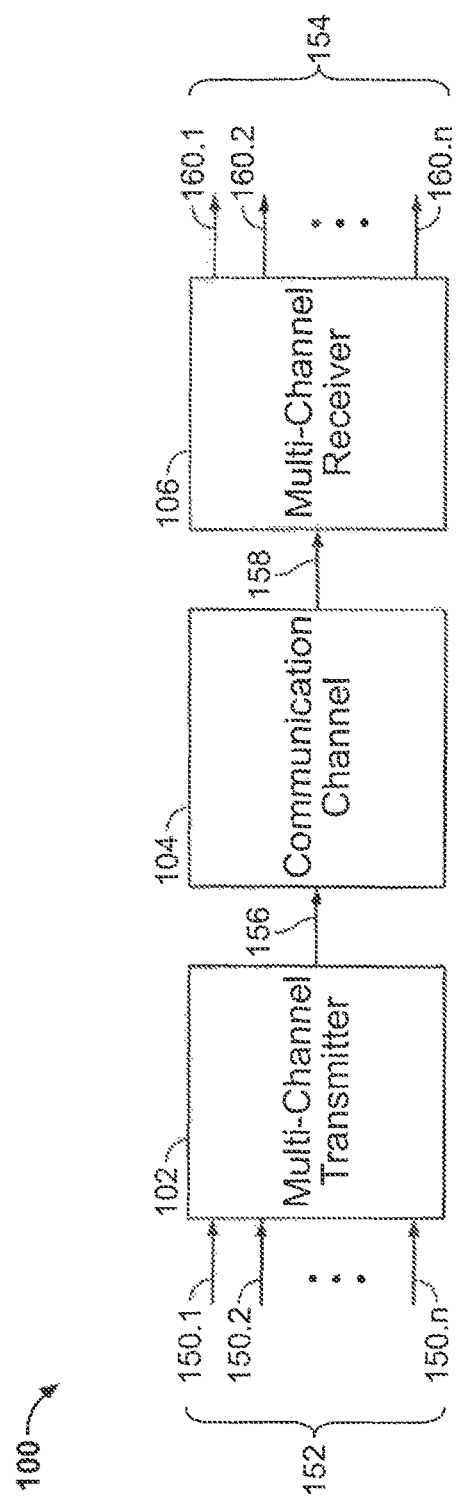
FIG. 1 is an illustration of a multi-channel communication system according to an exemplary embodiment of the present invention.

The present invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

FIG. 1 is an illustration of a multi-channel communication system according to an exemplary embodiment of the present invention. A multi-channel communication system 100 includes a multi-channel transmitter 102 to transmit a modulated representation of a multi-channel information signal 152 to a multi-channel receiver 106 via a communication channel 104. The information signal 152 includes n communication channels denoted as information channels 150.1 through 150.$n$. In an exemplary embodiment, the information channels 150.1 through 150.$n$ each have an approximate channel bandwidth of 6 or 8 Megahertz (MHz) such as on a downstream cable television and data system to provide an example. However, those skilled in the art(s) will recognize that other bandwidths and frequency spacing may be used without departing from the spirit and scope of the invention. The information channel channels 150.1 through 150.$n$ may include information-bearing signals such as a Quadrature Phase-Shift Keyed (QPSK), a Phase-Shift Keyed (PSK), a Quadrature Amplitude Modulated (QAM), or a Trellis Coded Modulated (TCM) modulated signal, an analog information signal, an analog modulated signal, or any combination thereof to provide some examples. Those skilled in the art(s) will recognize that other modulation schemes may be used without departing from the spirit and scope of the invention. In addition, those skilled in the art(s) will also recognize that the information channel 150 need not include an information-bearing signal without departing from the spirit and scope of the invention.

As shown in FIG. 1, the multi-channel transmitter 102 produces a transmitted multi-channel information signal 156 by modulating the multi-channel information signal 152. The transmitted multi-channel information signal 156 passes through the communication channel 104 to produce a received multi-channel information signal 158. The communication channel 104 may include a microwave radio link, a satellite channel, a fiber optic cable, a hybrid fiber optic cable System, or a copper cable to provide some examples. The communication channel 104 contains a propagation medium that the transmitted multi-channel information signal 156 passes through before reception by the multi-channel receiver 106. The propagation medium of the communication channel 104 introduces distortion into the transmitted multi-channel information signal 156 to produce the received multi-channel information signal 158. Noise such as, but not limited to, thermal noise, burst noise, impulse noise, interference, signal strength variations known as fading, phase shift variations, or multiple path delays known as multi-path propagation to provide some examples can introduce distortion into the transmitted multi-channel information signal 156.

Referring back to FIG. 1, the multi-channel communication system 100 includes the multi-channel receiver 106 to receive the received multi-channel information signal 158. The multi-channel receiver 106 produces a multi-channel information signal 154 by demodulating the received multi-channel information signal 158 then separating a demodulated representation of the received multi-channel information signal 158 into n communication channels. The multi-channel information signal 154 includes n communication channels denoted as information channels 160.1 through 160.$n$. The n information channels 160.1 through 160.$n$ may include information-bearing signals such as a Quadrature Phase-Shift Keyed (QPSK), a Phase-Shift Keyed (PSK), a Quadrature Amplitude Modulated (QAM), or a Trellis Coded Modulated (TCM) modulated signal, an analog information signal, an analog modulated signal, or any combination thereof to provide some examples. Those skilled in the art(s) will recognize that other modulation schemes may be used without departing from the spirit and scope of the invention. In addition, those skilled in the art(s) will also recognize that the n image corrected baseband information channels 160.1 through 160.$n$ need not include an information-bearing signal without departing from the spirit and scope of the invention.

Figures 2A, 2B:
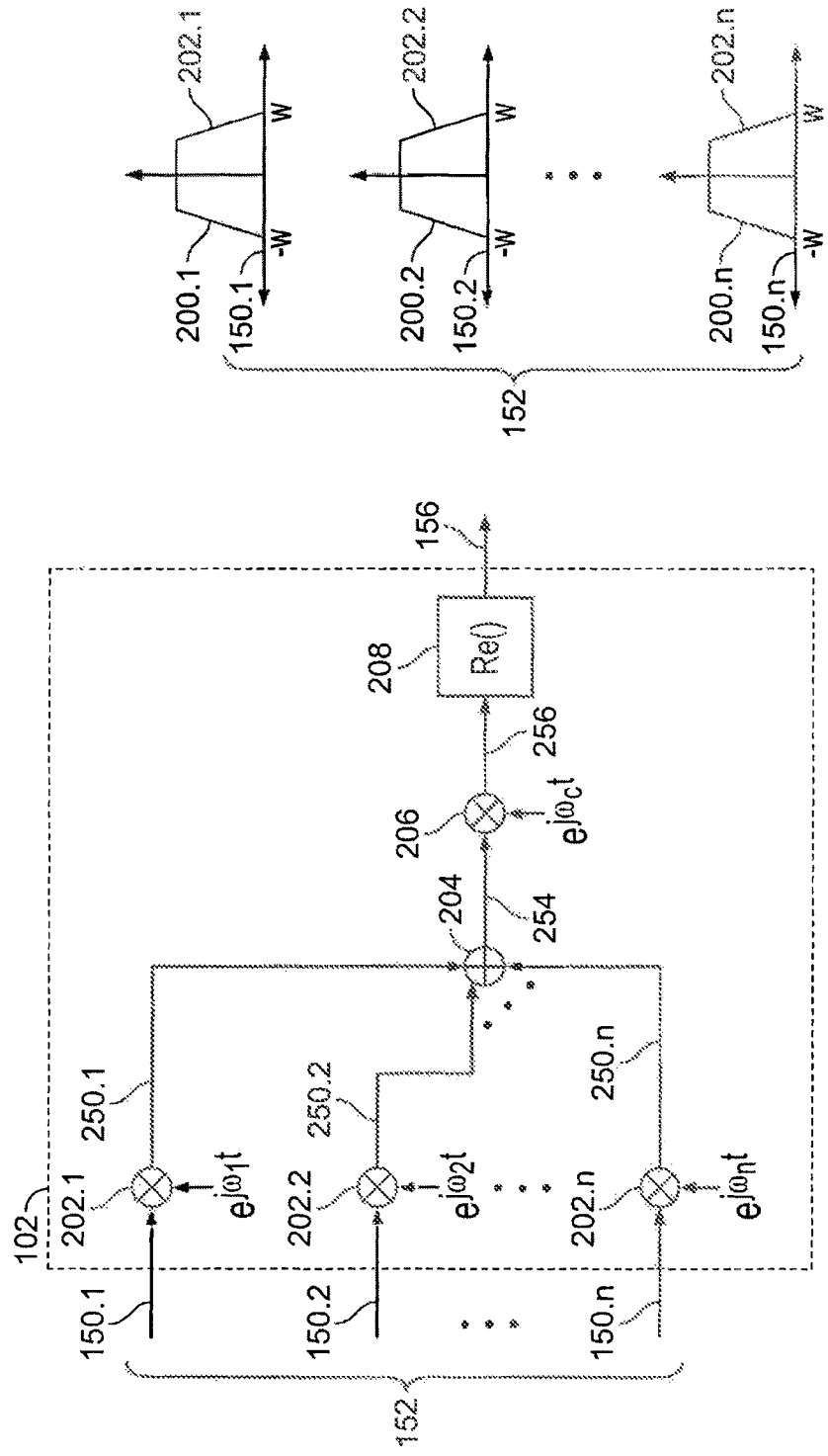
FIG. 2A is an illustration of a multi-channel transmitter according to an exemplary embodiment of the present invention.
FIG. 2B is an illustration of a multi-channel information channel according to an exemplary embodiment of the present invention.

FIG. 2A is an illustration of a multi-channel transmitter according to an exemplary embodiment of the present invention. In this exemplary embodiment, the multi-transmitter 102 modulates the multi-channel information signal 152 to produce the transmitted multi-channel information signal 156. Those skilled in the art(s) will recognize that the multi-channel transmitter 102 may be implemented according to any suitable modulation technique without departing from the spirit and scope of the invention.

The multi-channel transmitter 102 includes a mixer 202, a summer 204, a mixer 206, and a complex operation module 208. The mixer 202 produces a corresponding single channel upconverted information signal 250.1 through 250.$n$ by converting the information signal 152 to an intermediate frequency (IF). More specifically, the mixer 202 contains n mixers 202.1 through 202.$n$ to upconvert an information-bearing signal, if present, within a corresponding information channel 150.1 through 150.$n$ to a corresponding carrier frequency $\omega_1$ through $\omega_n$, denoted as $e^{j\omega_1 t}$ through $e^{j\omega_n t}$ in FIG. 2A. For example, the mixer 202.1 upconverts the information-bearing signal, if present, within the information channel 150.1 to a carrier frequency of $\omega_1$.

The summer 204 combines the single channel upconverted information signals 250.1 through 250.$n$ to produce a multi-channel information signal 254. The mixer 206 produces an upconverted multi-channel information signal 256 by upconverting the multi-channel information signal 254 to a corresponding carrier frequency $\omega_c$, denoted $e^{j\omega_c t}$ in FIG. 2A. In an exemplary embodiment, the carrier frequency $\omega_c$ may range from approximately 108 MHz to approximately 860 MHz. Those skilled in the art(s) will recognize that other carrier frequencies may be used without departing from the spirit and scope of the invention. The upconverted multi-channel information signal 256 may be expressed in a complex form including a real component and an imaginary component. The complex operation module 208 operates on the upconverted multi-channel information signal 256 by isolating the real component of the upconverted multi-channel information signal 256 to produce the transmitted multi-channel information signal 156.

FIG. 2B is an illustration of a multi-channel information signal according to an exemplary embodiment of the present invention. As shown in FIG. 2B, each information channel 150.1 through 150.$n$ in the multi-channel information signal 152 may include a, corresponding signal of interest 202.1 through 202.$n$ corresponding to an embedded information signal. Each information channel 150.1 through 150.$n$ may additionally include a residual signal 200.1 through 200.$n$, resulting from, but not limited to, a frequency-inverted duplicate or mirror image of a corresponding signal of interest 202.1 through 202.$n$, one or more neighboring information channels within the multi-channel information signal 152, or any other suitable source to provide some examples. The spectral representation of the multi-channel information signal 152 as shown in FIG. 2B is for illustrative purposes only. Those skilled in the art(s) will recognize the multi-channel information signal 152 may include any suitable spectral representation without departing from the spirit and scope of the invention. Referring back to FIG. 2B, the signals of interest 202.1 through 202.$n$ occupy the frequency range from 0 Hz to W Hz. Likewise, the residual signals 200.1 through 200.$n$ occupy the frequency range from −W Hz to 0 Hz. For example, the, signals of interest 202.1 through 202.$n$ may occupy the frequency spectrum from approximately 0 Hz to approximately 3 MHz. For this scenario, the residual signals 200.1 through 200.$n$ may occupy the frequency spectrum from approximately −3 MHz to approximately 0 Hz.

The multi-channel transmitter 102 uses a process to filter or cancel the residual signals 200.1 through 200.$n$ throughout the modulation process. However, if the filtering or canceling of the residual signals 200.1 through 200.$n$ within the multi-channel information signal 152 during the modulation process is not complete, an attenuated version of the residual signals 200.1 through 200.$n$ remains in the transmitted multi-channel information signal 156. In addition, frequency offsets present in the multi-channel transmitter 102, such as an offset between the in-phase components and the quadrature components of the multi-channel information signal 152 to provide an example, may also cause an attenuated version of the residual signals 200.1 through 200.$n$ to remain in the transmitted multi-channel information signal 156.

Figure 2C:
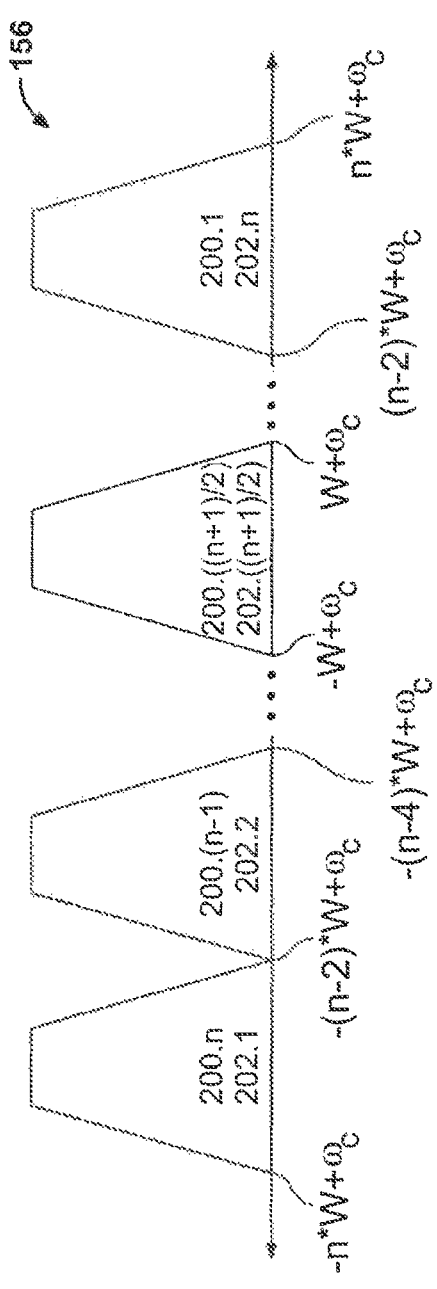
FIG. 2C is an illustration of a modulated multi-channel information signal according to an exemplary embodiment of the present invention.

FIG. 2C is an illustration of a transmitted multi-channel information signal 156 according to an exemplary embodiment of the present invention. FIG. 2C exemplifies a scenario where the multi-channel transmitter 102 does not substantially cancel the image of a corresponding signal of interest 202.1 through 202.$n$ within a corresponding residual signal 200.1 through 200.$n$. In addition, a frequency offset, such an offset in frequency between the in-phase components and the quadrature components of the corresponding signal of interest 202.1 through 202.$n$, causes one or more neighboring information channels within the multi-channel information signal 152 to be impressed within the corresponding residual signal 200.1 through 200.$n$. This exemplary embodiment demonstrates the transmitted multi-channel information signal 156 including having an odd number of channels, such the information channels 150.1 through 150.5 to provide an example.

As shown in FIG. 2C, a left most channel of the transmitted multi-channel information signal 156 occupying the frequency bandwidth from $-n*W+\omega_c$ to $-(n-2)*W+\omega_c$ contains a modulated version of the signal of interest 202.1, where n represents the number of communication channels in the transmitted multi-channel information signal 156, $\omega_c$ represents the carrier frequency used to transmit the transmitted multi-channel information signal 156, and 2 W represents the bandwidth of a corresponding signal of interest 202.1 through 202.$n$ included within the multi-channel information signal 152. The left most channel of the transmitted multi-channel information signal 156 may also include an attenuated version of the residual signal 200.1. The residual signal 200.1 may include, but is not limited to, a mirror image of the signal of interest 202.$n$, other communication signals from one or more neighboring information channels within the multi-channel information signal 152, or any other communication signal to provide some examples.

A next modulated channel occupying the frequency bandwidth from $-(n-2)*W+\omega_c$ to $-(N-4)*W+\omega_c$ contains a modulated version of the signal of interest 202.2. The next modulated channel of the transmitted multi-channel information signal 156 may also include an attenuated version of the residual signal 200.2. The residual signal 200.2 may include, but is not limited to, a mirror image of the signal of interest 202.($n$−1), other communication signals from one or more neighboring information channels within the multi-channel information signal 152, or any other communication signal to provide some examples.

A median modulated channel occupying the frequency bandwidth from $-W+\omega_c$ to $W+\omega_c$ contains a modulated version of the signal of interest 202.(($n$+1)/2). The median modulated channel of the transmitted multi-channel information signal 156 may also include an attenuated version of the residual signal 200.(($n$+1)/2). The residual signal 200.(($n$+1)/2) may include, but is not limited to, a mirror image of the signal of interest 202.(($n$+1)/2), other communication signals from one or more neighboring information channels within the multi-channel information signal 152, or any other communication signal to provide some examples.

A final modulated channel occupying the frequency bandwidth from $(n-2)*W+\omega_c$ to $n*W+\omega_c$ contains a modulated version of the signal of interest 202.$n$. The final modulated channel of the transmitted multi-channel information signal 156 may also include an attenuated version of the residual signal 200.$n$. The residual signal 200.$n$ may include, but is not limited to, a mirror image of the signal of interest 202.1, other communication signals from one or more neighboring information channels within the multi-channel information signal 152, or any other communication signal to provide some examples.

Figure 2D:
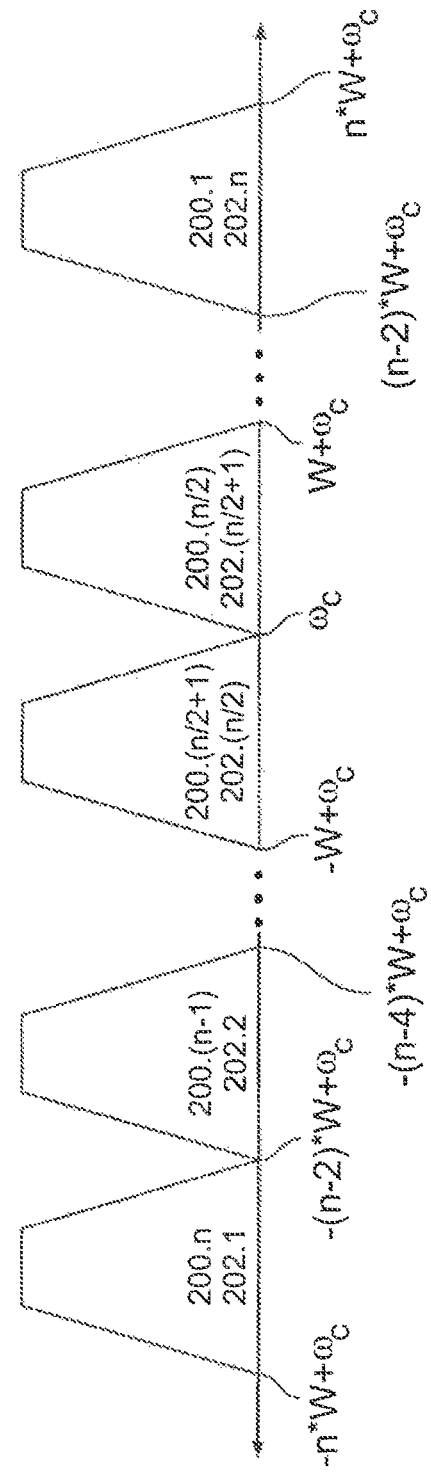
FIG. 2D is an illustration of an upconverted multi-channel information channel according to another exemplary embodiment of the present invention.

FIG. 2D is an illustration of a transmitted multi-channel information signal 156 according to another exemplary embodiment of the present invention. FIG. 2D exemplifies a scenario where the multi-channel transmitter 102 does not substantially cancel the image of a corresponding signal of interest 202.1 through 202.n within a corresponding residual signal 200.1 through 200.n. In addition, a frequency offset, such an offset in frequency between the in-phase components and the quadrature components of the corresponding signal of interest 202.1 through 202.n, causes one or more neighboring information channels within the multi-channel information signal 152 to be impressed within the corresponding residual signal 200.1 through 200.n. This exemplary embodiment demonstrates the transmitted multi-channel information signal 156 including having an even number of channels, such the information channels 150.1 through 150.4 to provide an example.

As shown in FIG. 2D, a left most channel of the transmitted multi-channel information signal 156 occupying the frequency bandwidth from $-n*W+\omega_c$ to $-(n-2)*W+\omega_c$ contains a modulated version of the signal of interest 202.1, where n represents the number of communication channels in the transmitted multi-channel information signal. 156, $\omega_c$ represents the carrier frequency used to transmit the transmitted multi-channel information signal 156, and W represents the bandwidth of a corresponding signal of interest 202.1 through 202.n included within the multi-channel information signal 152. The left most channel of the transmitted multi-channel information signal 156 may also include an attenuated version of the residual signal 200.1. The residual signal 200.1 may include, but is not limited to, a mirror image of the signal of interest 202.n, other communication signals from one or more neighboring information channels within the multi-channel information signal 152, or any other communication signal to provide some examples.

A next modulated channel occupying the frequency bandwidth from $-(n-2)*W+\omega_c$ to $-(n-4)*W+\omega_c$ contains a modulated version of the signal of interest 202.2. The next modulated channel of the transmitted multi-channel information signal 156 may also include an attenuated version of the residual signal 200.2. The residual signal 200.2 may include, but is not limited to, a mirror image of the signal of interest 202.(n−1), other communication signals from one or more neighboring information channels within the multi-channel information signal 152, or any other communication signal to provide some examples.

The corresponding carrier frequency $\omega_c$ lies adjacent to a first median modulated channel occupying the frequency bandwidth from $-2 W+\omega_c$ to $\omega_c$ and a second median modulated channel occupying the frequency bandwidth from $\omega_c$ to $2 W+\omega_c$. The first median modulated channel contains a modulated version of the signal of interest 202.(n/2). The first median modulated channel of the transmitted multi-channel information signal 156 may also include an attenuated version of the residual signal 200.(n/2). The residual signal 200.2 may include, but is not limited to, a mirror image of the signal of interest 202.((n/2)+1), other communication signals from one or more neighboring information channels within the multi-channel information signal 152, or any other communication signal to provide some examples. The second median modulated channel contains a modulated version of the signal of interest 202.((n/2)+1). The second median modulated channel of the transmitted multi-channel information signal 156 may also include an attenuated version of the residual signal 200.((n/2)+1). The residual signal 200.((n/2)+1) may include, but is not limited to, a mirror image of the signal of interest 202.(n/2), other communication signals from one or more neighboring information channels within the multi-channel information signal 152, or any other communication signal to provide some examples.

A final modulated channel occupying the frequency bandwidth from $(n-2)*W+\omega_c$ to $n*W+\omega_c$ contains a modulated version of the signal of interest 202.n. The final modulated channel of the transmitted multi-channel information signal 156 may also include an attenuated version of the residual signal 200.n. The residual signal 200.n may include, but is not limited to, a mirror image of the signal of interest 202.1, other communication signals from one or more neighboring information channels within the multi-channel information signal 152, or any other communication signal to provide some examples.

Figure 3A:
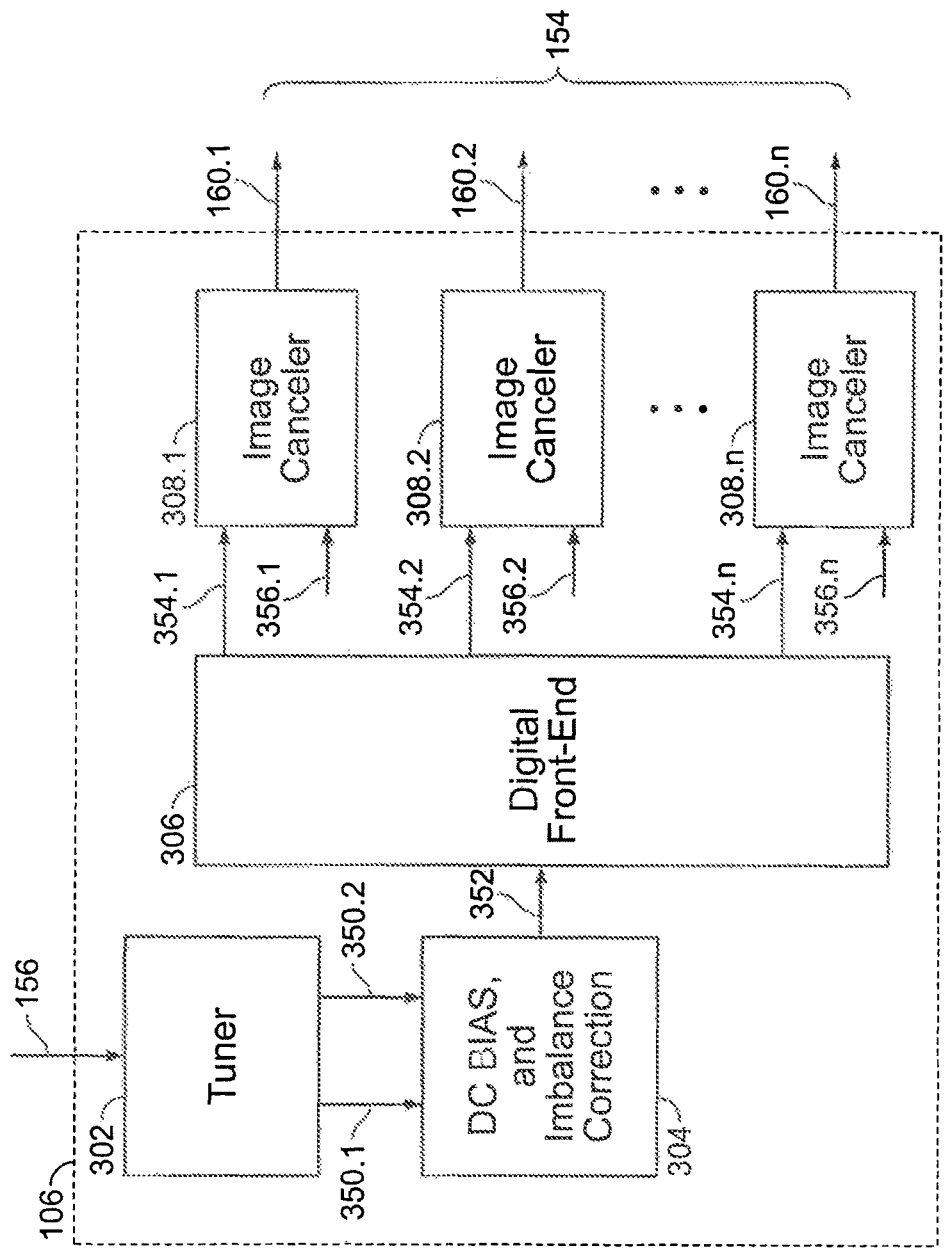
FIG. 3A is an illustration of a multi-channel receiver according to an exemplary embodiment of the present invention.

FIG. 3A is an illustration of a multi-channel receiver according to an exemplary embodiment of the present invention. In this exemplary embodiment, the multi-channel receiver 106 receives the transmitted multi-channel information signal 156 from the communication channel 104. The multi-channel receiver 106 produces a multi-channel information signal 154 by demodulating the received multi-channel information signal 158 then separating a demodulated representation of the received multi-channel information signal 158 into n communication channels. The multi-channel information signal 154 includes n communication channels denoted as information channels 160.1 through 152.n. The multi-channel receiver 106 includes a direct conversion tuner 302, a direct current (DC) bias and imbalance correction module 304, a digital front end 306, and an image canceler 308. The multi-channel receiver 106 will be explained in further detail referring to FIG. 4 through FIG. 10.

Figure 3B:
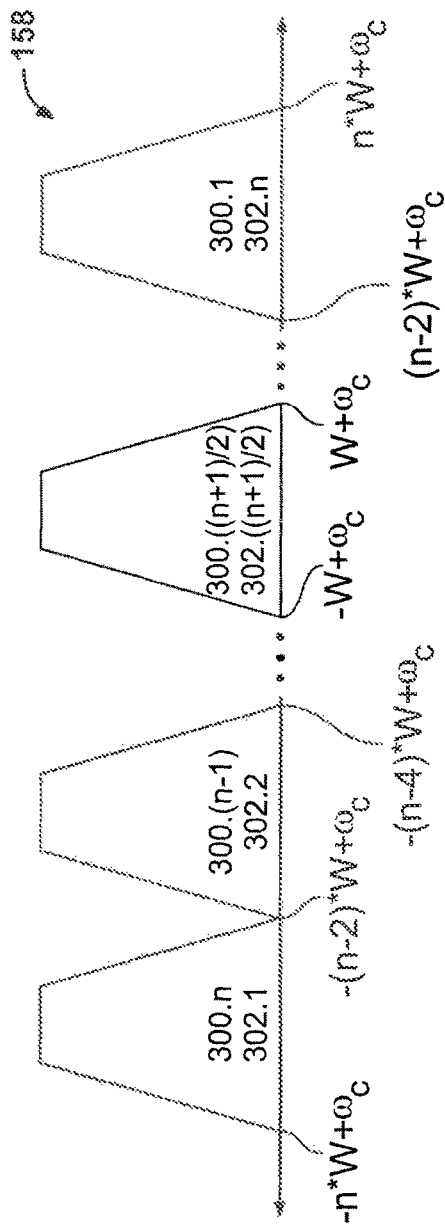
FIG. 3B is an illustration of a received multi-channel information channel according to an exemplary embodiment of the present invention.

FIG. 3B is an illustration of a received multi-channel information signal 158 according to an exemplary embodiment of the present invention. FIG. 3B exemplifies a scenario where the multi-channel transmitter 102 does not substantially cancel the image of a corresponding signal of interest 302.1 through 302.n within a corresponding residual signal 300.1 through 300.n. In addition, a frequency offset, such an offset in frequency between the in-phase components and the quadrature components of the corresponding signal of interest 302.1 through 302.n, causes one or more neighboring information channels within the multi-channel information signal 152 to be impressed within the corresponding residual signal 300.1 through 300.n. Further, the communication channel may introduce noise such as, but not limited to, thermal noise, burst noise, impulse noise, interference, signal strength variations known as fading, phase shift variations, or multiple path delays known as multi-path propagation to provide some into the received multi-channel information signal 158. This exemplary embodiment demonstrates the received multi-channel information signal 158 including having an odd number of channels, such the information channels 150.1 through 150.5 to provide an example.

As shown in FIG. 3B, a left most channel of the received multi-channel information signal 158 occupying the frequency bandwidth from $-n*W+\omega_c$ to $-(n-2)*W+\omega_c$ contains a modulated version of the signal of interest 302.1, where n represents the number of communication channels in the received multi-channel information signal 158, $\omega_c$ represents the carrier frequency used to transmit the received multi-channel information signal 158, and 2 W represents the bandwidth of a corresponding signal of interest 302.1 through 302.n included within the multi-channel information signal 152. The left most channel of the received multi-channel information signal 158 may also include an attenuated version of the residual signal 300.1. The residual signal 300.1 may include, but is not limited to, a mirror image of the signal of interest 302.n, other communication signals from one or more neighboring information channels within the multi-channel information signal 152, or any other communication signal to provide some examples.

A next modulated channel occupying the frequency bandwidth from $-(n-2)*W+\omega_c$ to $-(n-4)*W+\omega_c$ contains a modulated version of the signal of interest 302.2. The next modulated channel of the received multi-channel information signal 158 may also include an attenuated version of the residual signal 300.2. The residual signal 300.2 may include, but is not limited to, a mirror image of the signal of interest 302.($n-1$), other communication signals from one or more neighboring information channels within the multi-channel information signal 152, or any other communication signal to provide some examples.

A median modulated channel occupying the frequency bandwidth from $-W+\omega_c$ to $W+\omega_c$ contains a modulated version of the signal of interest 302.(($n+1$)/2). The median modulated channel of the received multi-channel information signal 158 may also include an attenuated version of the residual signal 300.(($n+1$)/2). The residual signal 300.(($n+1$)/2) may include, but is not limited to, a mirror image of the signal of interest 302.(($n+1$)/2), other communication signals from one or more neighboring information channels within the multi-channel information signal 152, or any other communication signal to provide some examples.

A final modulated channel occupying the frequency bandwidth from $(n-2)*W+\omega_c$ to $n*W+\omega_c$ contains a modulated version of the signal of interest 302.$n$. The final modulated channel of the received multi-channel information signal 158 may also include an attenuated version of the residual signal 300.$n$. The residual signal 300.$n$ may include, but is not limited to, a mirror image of the signal of interest 302.1, other communication signals from one or more neighboring information channels within the multi-channel information signal 152, or any other communication signal to provide some examples.

Figure 3C:
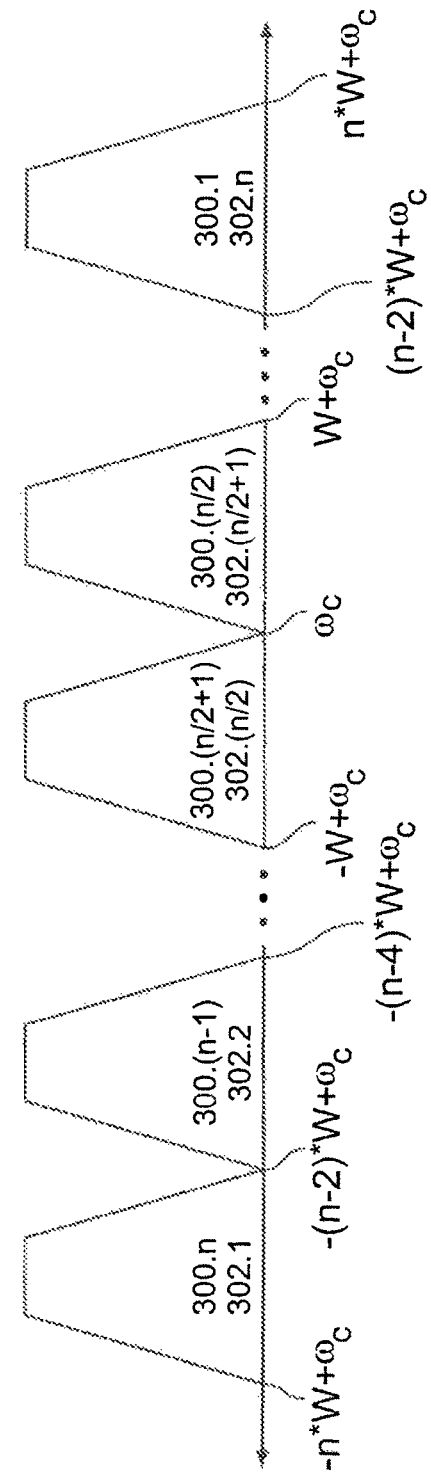
FIG. 3C is an illustration of a received multi-channel information channel according to another exemplary embodiment of the present invention.

FIG. 3C is an illustration of a received multi-channel information signal 158 according to another exemplary embodiment of the present invention. FIG. 3C exemplifies a scenario where the multi-channel transmitter 102 does not substantially cancel the image of a corresponding signal of interest 302.1 through 302.$n$ within a corresponding residual signal 300.1 through 300.$n$. In addition, a frequency offset, such an offset in frequency between the in-phase components and the quadrature components of the corresponding signal of interest 302.1 through 302.$n$, causes one or more neighboring information channels within the multi-channel information signal 152 to be impressed within the corresponding residual signal 300.1 through 300.$n$. This exemplary embodiment demonstrates the received multi-channel information signal 158 including having an even number of channels, such the information channels 150.1 through 150.4 to provide an example. Further, the communication channel may introduce noise such as, but not limited to, thermal noise, burst noise, impulse noise, interference, signal strength variations known as fading, phase shift variations, or multiple path delays known as multi-path propagation to provide some into the received multi-channel information signal 158.

As shown in FIG. 3C, a left most channel of the received multi-channel information signal 158 occupying the frequency bandwidth from $-n*W+\omega_c$ to $-(n-2)*W+\omega_c$ contains a modulated version of the signal of interest 302.1, where n represents the number of communication channels in the received multi-channel information signal 158, $\omega_c$ represents the carrier frequency used to transmit the received multi-channel information signal 158, and W represents the bandwidth of a corresponding signal of interest 302.1 through 302.$n$ included within the multi-channel information signal 152. The left most channel of the received multi-channel information signal 158 may also include an attenuated version of the residual signal 300.1. The residual signal 300.1 may include, but is not limited to, a mirror image of the signal of interest 302.$n$, other communication signals from one or more neighboring information channels within the multi-channel information signal 152, or any other communication signal to provide some examples.

A next modulated channel occupying the frequency bandwidth from $-(n-2)*W+\omega_c$ to $-(n-4)*W+\omega_c$ contains a modulated version of the signal of interest 302.2. The next modulated channel of the received multi-channel information signal 158 may also include an attenuated version of the residual signal 300.2. The residual signal 300.2 may include, but is not limited to, a mirror image of the signal of interest 302.($n-1$), other communication signals from one or more neighboring information channels within the multi-channel information signal 152, or any other communication signal to provide some examples.

The corresponding carrier frequency e lies adjacent to a first median modulated channel occupying the frequency bandwidth from $-2\ W+\omega_c$ to $\omega_c$ and a second median modulated channel occupying the frequency bandwidth from $\omega_c$ to $2\ W+\omega_c$. The first median modulated channel contains a modulated version of the signal of interest 302.($n/2$). The first median modulated channel of the received multi-channel information signal 158 may also include an attenuated version of the residual signal 300.($n/2$). The residual signal 300.2 may include, but is not limited to, a mirror image of the signal of interest 302.(($n/2$)+1), other communication signals from one or more neighboring information channels within the multi-channel information signal 152, or any other communication signal to provide some examples. The second median modulated channel contains a modulated version of the signal of interest 302.(($n/2$)+1). The second median modulated channel of the received multi-channel information signal 158 may also include an attenuated version of the residual signal 300.(($n/2$)+1). The residual signal 300.(($n/2$)+1) may include, but is not limited to, a mirror image of the signal of interest 302.($n/2$), other communication signals from one or more neighboring information channels within the multi-channel information signal 152, or any other communication signal to provide some examples.

A final modulated channel occupying the frequency bandwidth from $(n-2)*W+\omega_c$ to $n*W+\omega_c$ contains a modulated version of the signal of interest 302.$n$. The final modulated channel of the received multi-channel information signal 158 may also include an attenuated version of the residual signal 300.$n$. The residual signal 300.$n$ may include, but is not limited to, a mirror image of the signal of interest 302.1, other communication signals from one or more neighboring information channels within the multi-channel information signal 152, or any other communication signal to provide some examples.

FIG. 3D is an illustration of a received multi-channel information signal 158 according to an exemplary embodiment of the present invention. As shown in FIG. 3D, each information channel 150.1 through 152.$n$ in the multi-channel information signal 154 may include a corresponding signal of interest 302.1 through 302.$n$ corresponding to a processed representation of a corresponding signal of interest 202.1 through 202.$n$. Each information channel 150.1 through 152.$n$ may additionally include a residual signal 300.1 through 300.$n$. When compared to the residual signal 200.1 through 200, the residual signal 300.1 through 300.$n$ is substantially free of the interference and distortion caused by, but not limited to, the frequency-inverted duplicate or mirror image of a corresponding signal of interest 202.1 through 202.$n$, one or more neighboring information channels within the multi-channel information signal 152, or any other suitable source to provide some examples. The spectral representation of the multi-channel information signal 152 as shown in FIG. 3D is for illustrative purposes only. Those skilled in the art(s) will recognize the multi-channel information signal 152 may include any suitable spectral representation without departing from the spirit and scope of the invention.

FIG. 4 is an illustration of a direct conversion tuner according to an exemplary embodiment of the present invention. The direct conversion tuner 302 is capable of receiving the received multi-channel information signal 158 from the communication channel 104. The received multi-channel information signal 158 may include an odd number of channels, as shown in FIG. 3B or an even number of channels, as shown in FIG. 3C. The direct conversion tuner 302 produces a digitized information signal 350 by downconverting the received multi-channel information signal 158 directly to baseband in a single downconversion.

The direct conversion tuner 302 includes a mixer 402, a filter 404, an automatic gain control (AGC) module 406, and an analog to digital converter (ADC) 408. The mixer 402 multiplies the received multi-channel information signal 158 by a corresponding carrier frequency to down-convert an in-phase component and a quadrature component of the received multi-channel information signal 158 directly to baseband. More specifically, the mixer 402.1 extracts the in-phase component of the received multi-channel information signal 158, denoted as in-phase information signal 450.1, by multiplying the received multi-channel information signal 158 by $\cos((\omega_c+\omega_t)t+\phi)$. Ideally, the carrier frequency $\omega_c$ of the direct conversion tuner 302 is substantially equivalent to the carrier frequency of $\omega_c$ used by the multi-channel transmitter 102. However, in practice, the carrier frequency $\omega_c$ of the direct conversion tuner 302 may be offset from the carrier frequency of $\omega_c$ used by the multi-channel transmitter 102 by a phase offset of $\phi$ and a frequency offset of $\omega_t$. For example, the propagation medium or any variation in an oscillator of the direct conversion tuner 302 can cause the carrier offset $\phi$ and the frequency offset of $\omega_t$. Likewise, the mixer 402.2 extracts the quadrature phase component of the received multi-channel information signal 158, denoted as a quadrature phase information signal 450.2, by multiplying the received multi-channel information signal 158 by $\sin((\omega_c+\omega_t)t-\phi)$.

The filters 404 remove out of band interference resulting from, but not limited to, noise such as, but not limited to, thermal noise, burst noise, impulse noise, adjacent channels interference to provide some examples to produce a corresponding filtered information signal 452. The filter 404.1 produces a filtered in-phase information signal 452.1 by removing out of band signals, noise, and interference from the in-phase information signal 450.1 according to a transfer function h1. Similarly, the filter 404.2 produces a filtered quadrature phase information signal 452.2 by removing out of band signals, noise, and interference from the quadrature phase information signal 450.2 according to a transfer function h2. The transfer function h1 and the transfer function h2 need not be identical and may differ as a result of imbalances between the in-phase component and quadrature component of the received multi-channel information signal 158 to provide an example. By allowing the transfer h1 and the transfer function h2 to differ, the direct conversion tuner 302 may be designed so as to compensate for a frequency selective imbalance between the in-phase component and quadrature phase component of the received multi-channel information signal 158. On the other hand, if h1 and h2 differ in an unpredictable manner, they may introduce an unknown frequency selective imbalance between the in-phase component and quadrature phase component of the received multi-channel information signal 158. In an exemplary embodiment, the bandwidth of the transfer function h1 and the bandwidth of transfer function h2 are substantially large enough to allow a downconverted representation of the multi-channel information signal 254 as shown in FIG. 2 to pass through filter 404.1 and filter 404.2 respectively without substantial distortion or stopband attenuation.

The AGC 406 amplifies and/or attenuates a corresponding filtered information signal 452 to produce a corresponding magnitude corrected information signal 454. The AGC 406.1 produces a magnitude corrected in phase information signal 454.1 by amplifying and/or attenuating the filtered in-phase information signal 452.1. Likewise, the AGC 406.2 produces a magnitude corrected quadrature phase information signal 454.2 by amplifying and/or attenuating filtered quadrature phase information signal 452.2. The gain of AGC 406.1 and AGC 406.2 need not be identical and can differ to correct a magnitude imbalance between the in-phase component and quadrature component of the of the received multi-channel information signal 158. In an exemplary embodiment, AGC 406 is optional; the filtered information signal 452 may be directly used as an input to ADC 408.

The ADC 408 converts a corresponding magnitude corrected information signal 454 from an analog signal to produce a corresponding digitized information signal 350. The digitized information signal 350.1 represents a digitized down-converted version of the in-phase component of the received multi-channel information signal 158 directly to baseband. The digitized information signal 350.2 represents a digitized down-converted version of the quadrature component of the received multi-channel information signal 158 directly to baseband.

Figure 5:
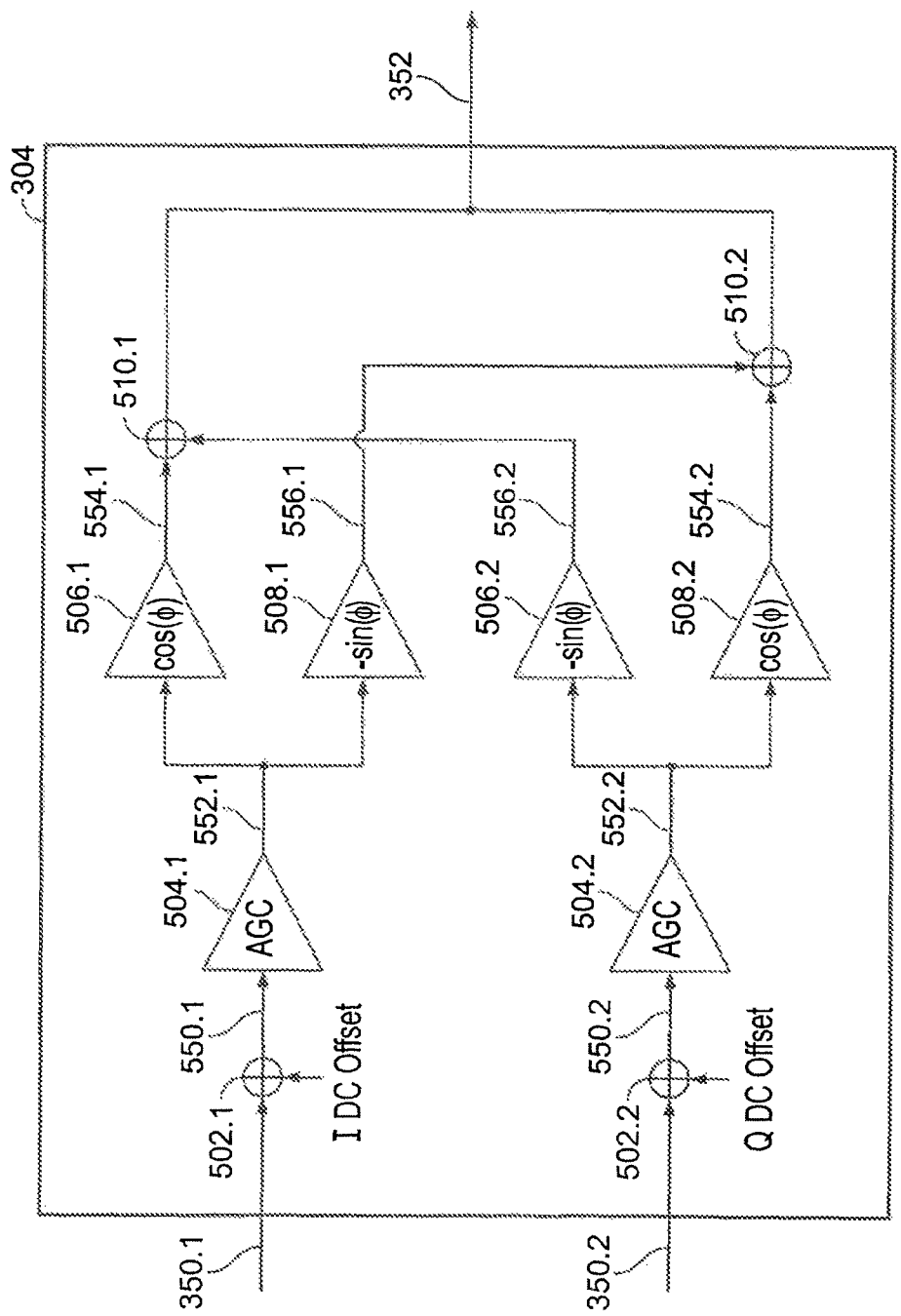
FIG. 5 is an illustration of a direct current bias and imbalance correction module according to an exemplary embodiment of the present invention.

FIG. 5 is an illustration of a direct current bias and imbalance correction module according to an exemplary embodiment of the present invention. The direct current (DC) bias and imbalance correction module 304 substantially removes a DC offset generated from the direct conversion tuner 302. The DC bias and imbalance correction module 304 may substantially negate an imbalance between the in-phase component and the quadrature component present in the information-bearing signal within the received multi-channel information signal 158.

The DC bias and imbalance correction module 304 includes a summer 502, an AGC 504, an in-phase balance correction module 506, a quadrature balance correction module 508, and a summer 510. The summer 502 removes the DC offset impressed onto the digitized information signal 350 during the down-conversion of the received multi-channel information signal 158. The summer 502.1 substantially removes or cancels the DC offset present in the digitized information signal 350.1 to produce a DC adjusted information signal 550.1 by subtracting the DC offset, denoted as I DC Offset, from the digitized information signal 350.1. Likewise, the summer 502.2 removes or cancels the DC offset present in the digitized information signal 350.2 to produce a DC adjusted information signal 550.2 by subtracting the DC offset, denoted as a Q DC Offset, from the digitized information signal 350.2.

The AGC 504 operates upon the DC adjusted information signal 550 to correct for differences in magnitude between the in-phase component and the quadrature component of the received multi-channel information signal 158. The differences in magnitude may result from a difference in the attenuation of the in-phase component and the quadrature component of either the multi-channel transmitter 1.02 or the multi-channel receiver 106 to provide some examples. The AGC 504.1 attenuates the DC adjusted information signal 550.1 to produce a magnitude adjusted information signal 552.1. Similarly, the AGC 504.2 attenuates the DC adjusted information signal 550.2 to produce a magnitude adjusted information signal 552.2.

The phase offset of φ may be determined by the cross-correlation of the in-phase component and the quadrature component of the received multi-channel information signal 158 in either direct conversion tuner 302 after the mixer 402 or before the phase balance correction module 506 and quadrature balance correction module 508 of the direct current (DC) bias and imbalance correction module 304. The in-phase balance correction module 506 operates in conjunction with the quadrature balance correction module 508 and the summer 510 to correct for phase offset of φ resulting from the down-conversion of the received multi-channel information signal 158 by direct conversion tuner 302. More specifically, the in-phase balance correction module 506.1 attenuates the magnitude adjusted information signal 552.1 by cos (φ) to produce a signal 554.1, while in-phase balance correction module 506.2 attenuates the magnitude adjusted information signal 552.2 by cos(φ) to produce a signal 554.2. The quadrature balance correction module 508.1 attenuates the magnitude adjusted information signal 552.1 by −sin(φ) to produce signal a 556.1, while quadrature balance correction module 508.2 attenuates the magnitude adjusted information signal 552.2 by −sin(φ) to produce signal a 556.2. The summer 510 then compensates for phase offset of φ resulting from the down-conversion of the received multi-channel information signal 158 by combining corresponding signals 554 and corresponding signals 556. The offset corrected signal 352 is a complex information signal including a phase corrected in-phase component and a phase corrected quadrature component. The summer 510.1 generates the phase corrected in-phase component by combining the signal 554.1 with the signal 556.2, while the summer 510.2 generates the phase corrected in quadrature component by combining signal the 554.2 with signal the 556.1. As a result, the in-phase component of the offset corrected signal 352 may be represented as:

$$\frac{I*\cos(\phi) - Q*\sin(\phi)}{\cos^2(\phi) - \sin^2(\phi)}, \quad (1)$$

where φ represents the phase offset of φ shown in FIG. 4, I represents the magnitude adjusted information signal 552.1, and Q represents the magnitude adjusted information signal 552.2. Similarly, the quadrature component of the offset corrected signal 352 may be represented as:

$$\frac{-I*\sin(\phi) + Q*\cos(\phi)}{\cos^2(\phi) - \sin^2(\phi)}, \quad (2)$$

where φ represents the phase offset of φ shown in FIG. 4, I represents the magnitude adjusted information signal 552.1, and Q represents the magnitude adjusted information signal 552.2.

Figure 6:
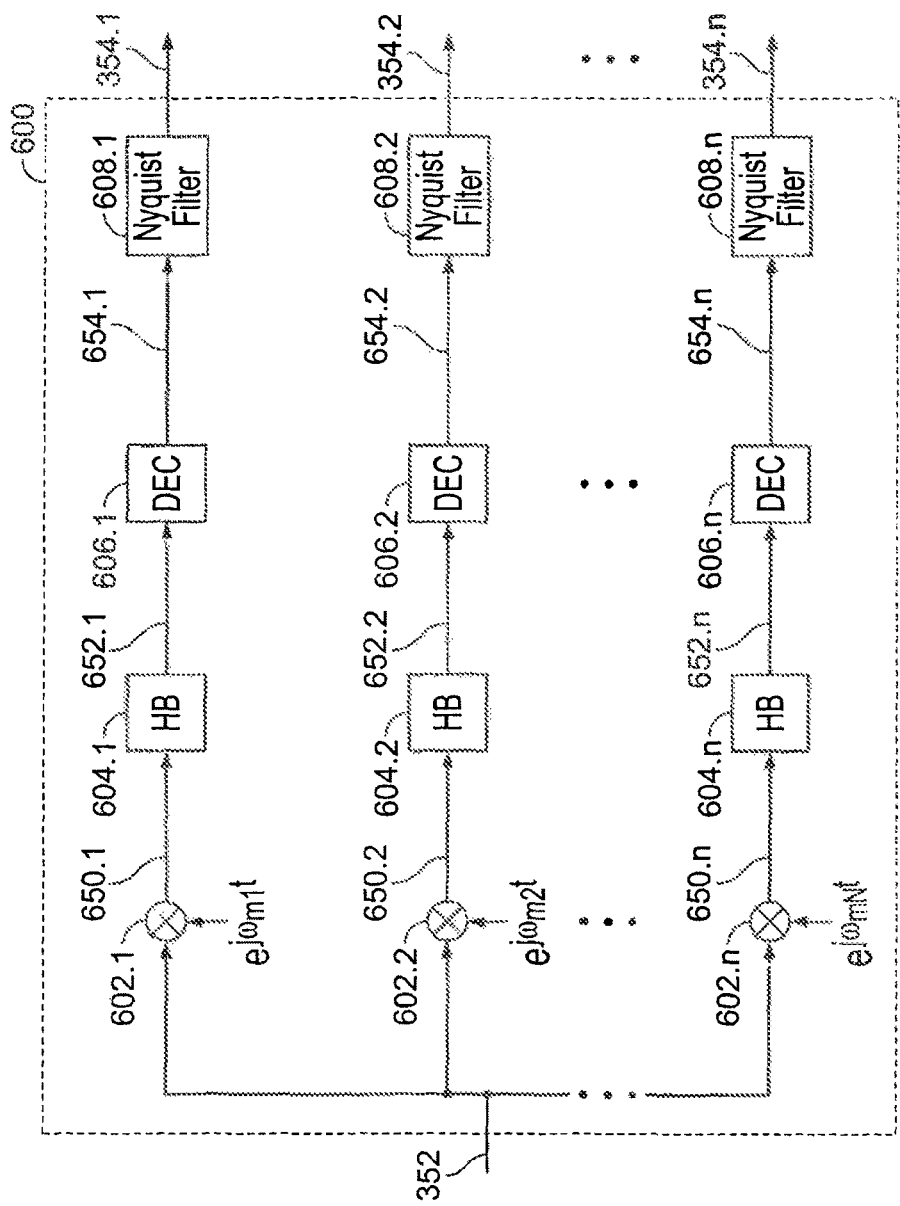
FIG. 6 is an illustration of a digital front end according to an exemplary embodiment of the present invention.

FIG. 6 is an illustration of a digital front end according to an exemplary embodiment of the present invention. The digital front end 600 separates the offset corrected signal 352 into the n channels corresponding to the information channels 150.1 through 150.n as shown in FIG. 1 and FIG. 2. The digital front end 600 may represent an exemplary implementation of the digital front end 306 as shown in FIG. 3. The multi-channel receiver 106 may include the digital front end 600 for a received multi-channel information signal 158 including an unknown frequency offset, denoted as of $\omega_t$ as shown in FIG. 4. The unknown frequency offset of $\omega_t$ is capable of being accurately measured and completely compensated for in by the multi-channel receiver 106, and/or the unknown frequency offset of $\omega_t$ is substantially zero.

The digital front end 600 includes a mixer 602, a half-band filter 604, a decimator 606, and a Nyquist filter 608. The mixer 602 further down-converts the offset corrected signal 352 to allow for the separation into the n information channels of the received multi-channel information signal 158. The mixer 602 comprises of n multipliers 602.1 through 602.n to down-convert the offset corrected signal 352 by a corresponding downconversion frequency $\omega_{m1}$ through $\omega_{mN}$, denoted as $e^{j\omega_{m1}t}$ through $e^{j\omega_{mN}t}$ in FIG. 6. The Frequency of individual downconversion frequencies $\omega_{m1}$ through $\omega_{mN}$ is chosen to allow for the downconversion of a corresponding information channel to baseband. For the received multi-channel information signal 158 having an odd number of information channels, the carrier frequency $\omega_c$ of the multi-channel transmitter 102 and/or the multi-channel receiver 106 may be selected to allow for a downconversion frequency, namely $\omega_{m(N/2)}$, corresponding to the median information channel, such as the median modulated channel in FIG. 2C to be substantially zero. For example, for a multi-channel receiver containing five information channels, the carrier frequency $\omega_c$ of the multi-channel transmitter 102 and/or the multi-channel receiver 106 is selected to such that downconversion frequency corresponding to the middle information channel, namely $\omega_{m3}$, is substantially zero. This allows the frequency of the downconversion frequency $\omega_{m2}$ to be a negative representation of the downconversion frequency $\omega_{m4}$. Likewise, the frequency of the downconversion frequency $\omega_{m1}$ is a negative representation of the downconversion frequency $\omega_{m5}$.

The half-band filter 604 operates in conjunction with the decimator 606 to eliminate out of channel interference from a corresponding channel. The half-band filter 604 comprises n half band filters 604.1 through 604.n to filter a corresponding baseband information channel 650.1 through 650.n. In an exemplary embodiment, the half-band filter 604 has a bandwidth substantially greater than the bandwidth of the corresponding the information channels 150.1 through. 150.n. The decimator 606 comprises n decimators 606.1 through 606.n to resample a corresponding filtered information signal 652.1 through 652.n. The reduction in the bandwidth of the baseband information channel 650.1 through 650.n by the corresponding half band filter 604.1 through 604.n allows for a reduction in the sample rate of the digital front end 306 by a corresponding decimator 606.1 through 606.n.

The Nyquist filter 608 produces a single channel information signal 358.1 through 358.n by filtering a corresponding decimated baseband information signal 654. More specifically, the Nyquist filter comprises n Nyquist filters 608.1 through 608.n to filter a corresponding decimated baseband information signal 654.1 through 654.n. The Nyquist 608 filters the decimated baseband information signal 654 with a filter whose shape matches the pulse shape of the information channel 150. In addition to limiting the amount of noise spectrum passed onto subsequent stages, the Nyquist 608 correlates the decimated baseband information signal 654 with the transmitted communication signal.

Figure 7:
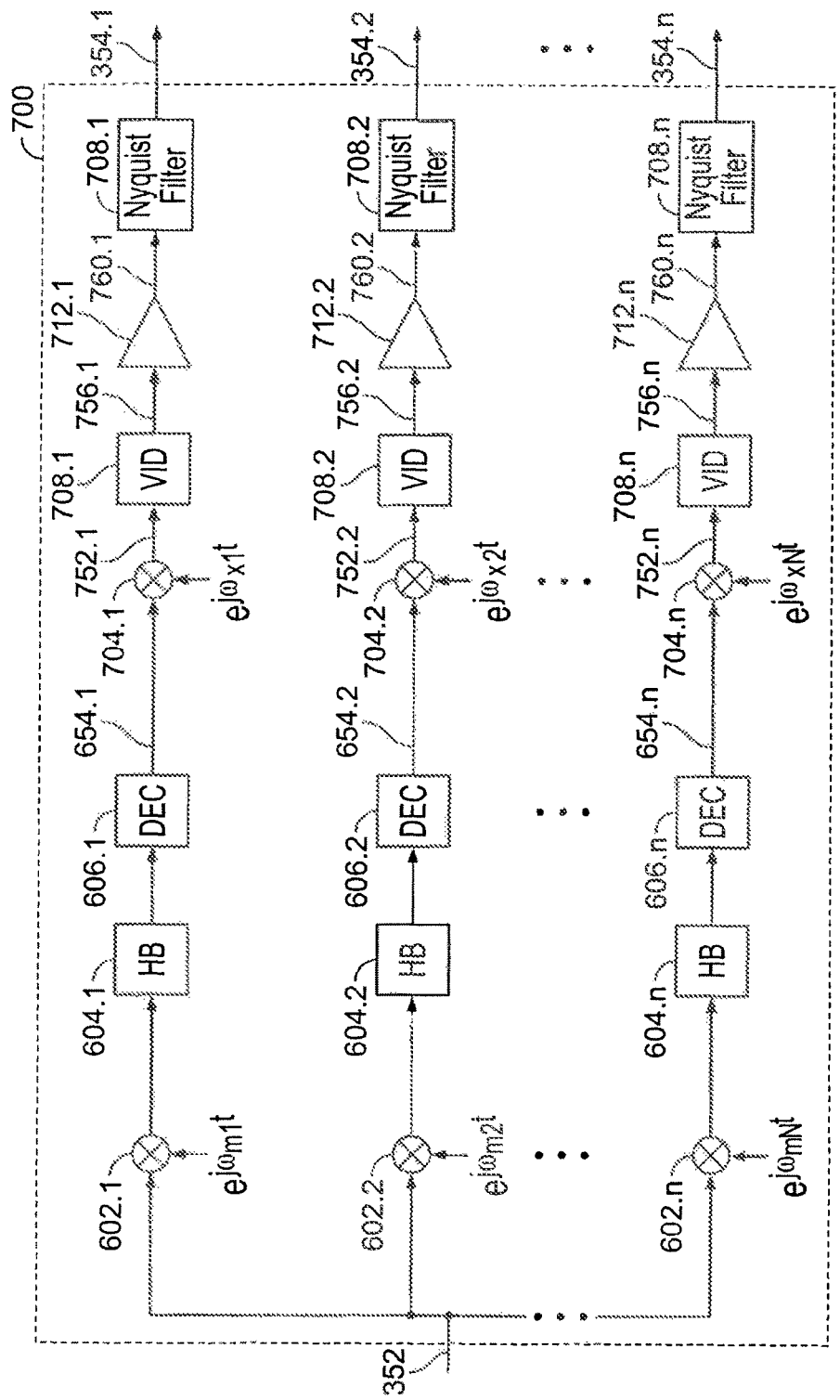
FIG. 7 is an illustration of a digital front end according to another exemplary embodiment of the present invention.

FIG. 7 is an illustration of a digital front end according to another exemplary embodiment of the present invention. As with the digital front end 600, the digital front end 700 separates the offset corrected signal 352 into the n channels corresponding to the information channels 150.1 through 150.n as shown in FIG. 1 and FIG. 2. The multi-channel receiver 106 may include the digital front end 600 for a received multi-channel information signal 158 including an unknown frequency offset, denoted as of $\omega_t$ as shown in FIG. 4. The unknown frequency offset of $\omega_t$ is capable of being accurately measured and completely compensated for in by the multi-channel receiver 106, and/or the unknown frequency offset of $\omega_t$ is substantially zero.

The digital front end 700 includes a mixer 602, a half-band filter 604, a decimator 606, a mixer 704, a variable interpolator decimator (VID) 708, an automatic gain control (AGC) module 712, and a Nyquist filter 708. The mixer 602, the half-band filter 604, and the decimator 606 operate in a substantially similar manner as described in FIG. 6. The mixer 704 further down-converts the decimated baseband information signal 654 to baseband to remove residual frequency offsets such as the unknown frequency offset of $\omega_t$ to provide an example. More specifically, mixer 704 comprises of n mixers 704.1 through 704.n to down-convert a corresponding decimated baseband information signal 654.1 through 654.n using a carrier frequency $\omega_{x1}$ through $\omega_{xN}$, denoted as $e^{j\omega_{x1}t}$ through $e^{j\omega_{xN}t}$.

The VID 708 comprises of n VIDs 708.1 through 708.n to resample a corresponding information signal 752 from the sampling rate used by A/D 408 as shown in FIG. 4. In an exemplary embodiment, the VID 708 resamples the to an integer number of samples per symbol as in accordance with the modulation scheme of the received multi-channel information signal 158. The AGC module 712 comprises of n AGC modules 708.1 through 708.n to amplify and/or attenuate a corresponding resampled information signal 756.1 through 756.n. AGC 712 ensures the resampled information signals 756.1 through 756.n have substantially equal amplitudes.

The Nyquist filter 708 produces a single channel information signal 354.1 through 354.n by filtering a corresponding amplitude corrected information signal 760.1. More specifically, the Nyquist filter comprises n Nyquist filters 708.1 through 708.n to filter a corresponding amplitude corrected information signal 760. The Nyquist 708 filters the resampled information signal 756 with a filter whose shape matches the pulse shape of the information channel 150. In addition to limiting the amount of noise spectrum passed onto subsequent stages, the Nyquist 708 provides the multi-channel receiver 106 with a stronger signal to work with by correlating the resampled information signal 756 with the pulse shape of the transmitted communication signal over the symbol period, according to the well-known principle of matched filtering.

Figures 8A, 8B:
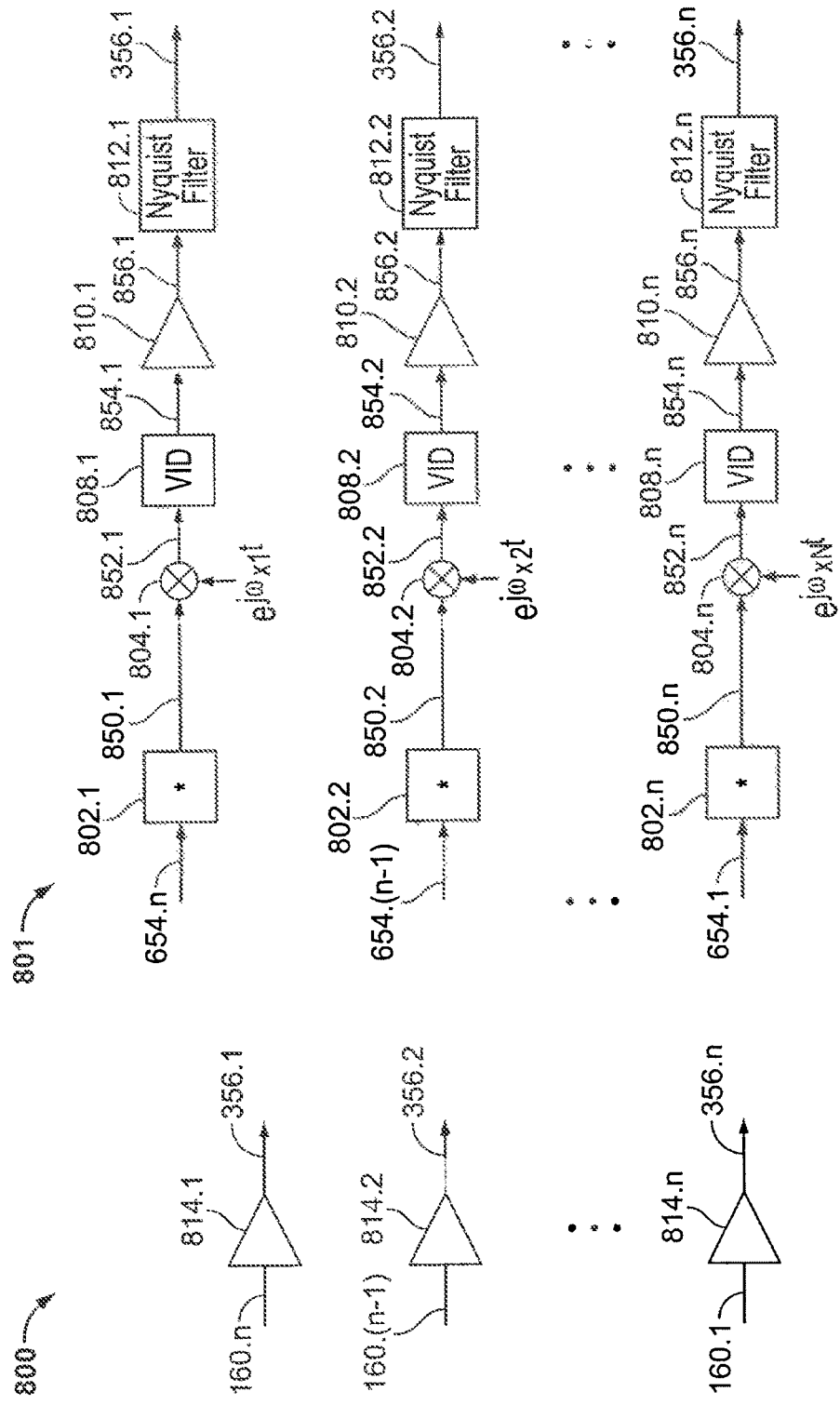
FIG. 8A is an illustration of an image generator according to an exemplary embodiment of the present invention.
FIG. 8B is an illustration of an image generator according to an exemplary embodiment of the present invention.

FIG. 8A is an illustration of an image reference generator according to an exemplary embodiment of the present invention. An image reference generator 800 may be used by the multi-channel receiver 106 to produce a corresponding reference residual signal 356.1 through 356.n in FIG. 3A. The image reference generator 800 operates upon a corresponding information channel 160.1 through 160.n to produce the corresponding reference residual signal 356.1 through 356.n to be used by the adaptive decision feedback equalizer (DFE), image canceler module 312. The DFE, image canceler module 312, shown in FIG. 9 and FIG. 10, utilizes the reference residual signal 356 to suppress or remove the reference residual signal 356.1 through 356.n from a corresponding information channel in the received multi-channel information signal 158. In an exemplary embodiment, the image reference generator 801 is used in conjunction with digital front end 700 where the frequency offset of $\omega_t$ as shown in FIG. 4 may be substantially zero or accurately measured and completely compensated for by the multi-channel receiver 106.

The image reference generator 800 includes an AGC module 814. Without the AGC module 814 or other means to control the adaptation step size, the least-squares algorithm used by the image canceler 308 may become unstable for large image signals. The AGC module 814 comprises n AGC modules 814.1 through 814.n to amplify and/or attenuate the magnitude of a corresponding information channel 160.1 through 152.n to produce the corresponding reference residual signal 356.1 through 356.n. For example, the AGC module 814.1 amplifies and/or attenuates the magnitude of the information channel 160.n to produce the reference residual signal 356.1.

FIG. 8B is an illustration of an image reference generator according to another exemplary embodiment of the present invention. The image reference generator 801 may be used by multi-channel receiver 106 to produce a corresponding reference residual signal 356.1, through 356.n in FIG. 3A. The image reference generator 801 operates upon a corresponding information channel 160.1 through 152.n to produce the corresponding reference residual signal 356.1 through 356.n to be used by the adaptive decision feedback equalizer (DFE), image canceler module 312. The DFE, image canceler module 312, shown in FIG. 9 and FIG. 10, utilizes the reference residual signal 356 to suppress or remove the reference residual signal 356.1 through 356.n from a corresponding information channel in the received multi-channel information signal 158. In an exemplary embodiment, the image reference generator 801 is used in conjunction with digital front end 700 where the frequency offset of $\omega_t$ as shown in FIG. 4 may not be substantially zero nor accurately measured and completely compensated for.

The image reference generator 801 includes a conjugate module 802, a mixer 804, a variable interpolator decimator (VID) 808, an automatic gain control (AGC) module 810, and a Nyquist filter 812. The conjugate module 802 conjugates a corresponding decimated baseband information signal 654. More specifically, conjugate module 802 comprises n conjugate modules 802.1 through 801.n to conjugate a corresponding decimated baseband information signal 654.n through 654.1 to produce a conjugated baseband image 850.1 through 850.n. In other words, the conjugate module 802 frequency inverts or mirrors a decimated version of a corresponding information channel 150.1 through 150.n of the received multi-channel information signal 158 as shown in FIG, 3B. For example, the conjugate module 802.1 produces a mirror image of decimated baseband information signal 654.1.

The mixer 804 further down-converts the conjugated baseband image 850 to baseband to remove residual frequency offsets such as frequency offset of $\omega_t$ to provide an example. More specifically, the mixer 804 comprises of n mixers 804.1 through 804.n produces a down-converted baseband image 852.1 through 852.n by down-converting the conjugated baseband image 850.1 through 850.n using a carrier frequency $\omega_{x1}$ through $\omega_{xN}$, denoted as $e^{j\omega_{x1}t}$ through $e^{j\omega_{xN}t}$. In an exemplary embodiment, the frequency of carrier frequency $\omega_{x1}$ through $\omega_{xN}$ are substantially equivalent a corresponding frequency of carrier frequency $\omega_{x1}$ through $\omega_{xN}$ as shown in FIG. 7.

The VID 808 comprises of n VIDs 808.1 through 808.n to resample a corresponding down-converted baseband image 852 from the sampling rate used by A/D 408 as shown in FIG. 4 to, for example, an integer number of samples per symbols as in accordance with the modulation scheme of the received multi-channel information signal 158. AGC module 810 comprises of n AGC modules 810.1 through 810.n to attenuate a corresponding resampled baseband image 854.1 through 854.n. AGC 712 ensures the resampled baseband image 854.1 through 854.n have substantially equal amplitudes.

The Nyquist filter 812 produces the reference residual signal 356 by filtering the amplitude corrected baseband image 856. More specifically, the Nyquist filter comprises n Nyquist filters 812.1 through 812.n to filter a corresponding amplitude corrected baseband image 856.1 through 856.n. The Nyquist 812 filters amplitude corrected baseband image 856 with a filter whose shape matches the pulse shape of the information channel 150. In addition to limiting the amount of noise spectrum, passed onto subsequent stages, the Nyquist 812 provides the multi-channel receiver 106 with a stronger image signal to work with by correlating the amplitude corrected baseband image 856 with the pulse shape of the transmitted communication signal over the symbol period.

Figure 9A:
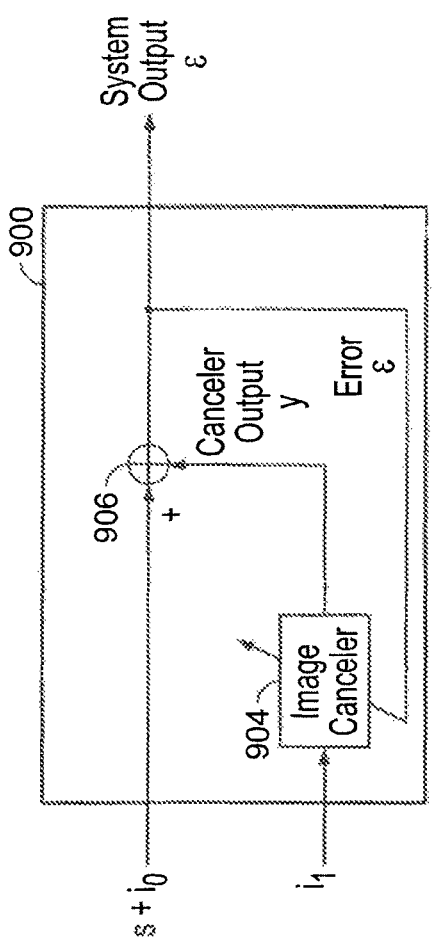
FIG. 9A is an illustration of an adaptive image canceler according to an exemplary embodiment of the present invention.

FIG. 9A is an illustration of an adaptive image canceler according to an exemplary embodiment of the present invention. In an exemplary embodiment, adaptive image canceler 900 may be used to implement image canceler 308.1 through 308.n as shown in FIG. 3A.

The method to estimate a signal corrupted by an image is to pass the composite signal through an image canceler that tends to suppress the image while leaving the signal relatively unchanged image canceling is a variation of optimal filtering that uses an auxiliary or reference input, denoted as $i_1$. This input is filtered by an image canceler module 904 and subtracted from a primary input, denoted as $s+i_0$, containing both the signal and the image by a summer 906. As a result, the image, $i_0$, is attenuated or eliminated by cancellation. The image canceler 904 may be implemented using a suitable adaptive filter including multiple equalization taps that adjusts equalization coefficients corresponding to the equalization taps to cause an output y to be a best least-squares fit of the image $i_1$.

Still referring to FIG. 9A, a receiver receives the signal s plus an uncorrelated image $i_0$. The combined signal and image, $s+i_0$, form the "primary input" to the canceler. A receiver generates an image $i_1$ which is uncorrelated with the signal s but correlated with the image $i_0$. The image $i_1$ is filtered to produce an output y that is a close replica of $i_0$. This output is subtracted from the primary input $s+i_0$ to produce the system output, $s+i_0-y$. The image $i_1$ is processed by the image canceler module 904 that automatically adjusts its own impulse response through a least-squares algorithm, such as the widely known Least Mean Squared (LMS) or Recursive Least Squares (RLS) algorithms, which responds to an error signal $\epsilon$ dependent on the image canceler's output y. Thus with the proper algorithm, the image canceler can operate under changing conditions and can readjust itself continuously to minimize the error signal.

In image canceling systems based on a least squares criterion, the practical objective is to produce a system output, $s+i_0-y$, that is a best fit in the least-squares sense to the signal s. This objective is accomplished by feeding the system output s back to the image canceler module 904 and adjusting the image canceler module 904 through an adaptive algorithm to minimize the total system output power. Adjusting or adapting the image canceler module 904 to minimize the total output power is tantamount to causing the output $\epsilon$ to be a best least-squares estimate of the signal s for the given structure and adjustability of the adaptive image canceler module 904 and for the given image $i_1$. The output $\epsilon$ will generally contain the signal s with some of the image $i_0$ remaining. Minimizing the total output power minimizes the output noise power and, since the signal in the output remains constant, minimizing the total output power maximizes the output signal-to-noise ratio. Image canceling systems are further described in Bernard Widrow & Samuel D. Stearns, *Adaptive Signal Processing* 302-361 (1985), which is incorporated herein by reference in its entirety.

Figure 9B:
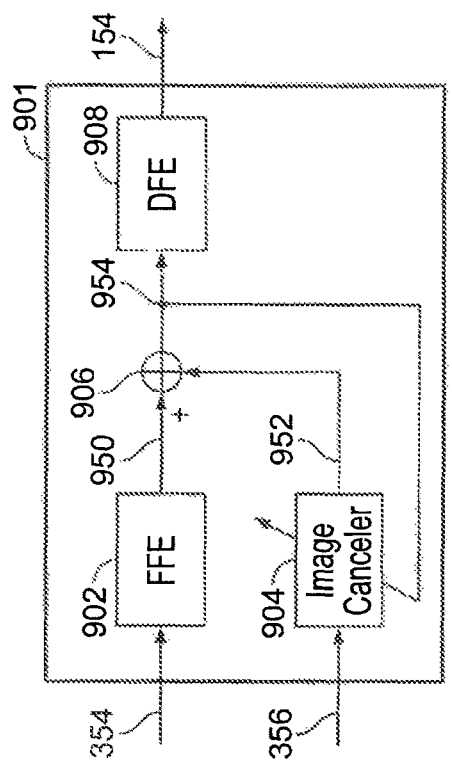
FIG. 9B is an illustration of an adaptive image canceler according to another exemplary embodiment of the present invention.

FIG. 9B is an illustration of an adaptive image canceler according to an exemplary embodiment of the present invention. In an exemplary embodiment, an adaptive image canceler 901 may be used to implement image canceler 308.1 through 308.n as shown in FIG. 3A. The image canceler 901 operates in a substantially similar manner as image canceler 900 except the image canceler 901 contains a feed forward equalizer (FFE) 902 and a decision feedback equalizer (DFE) 908.

The FFE 902 produces an equalized single channel information signal 950 by correcting for distortion caused by the communication channel 104 present the single channel information signal 354. During transmission, a propagation medium of the communication channel 104 may introduce distortion into the transmitted multi-channel information signal 156 causing the information-bearing signals within the received multi-channel information signal 158 to differ from the information-bearing signals within the transmitted multi-channel information signal 156. Noise, interference, signal strength variations known as fading, phase shift variations, or multiple path delays known as multi-path propagation may introduce distortion into the transmitted multi-channel information signal 156. The FFE 902 compensates for this distortion in the single channel information signal 354 to produce the equalized single channel information signal 950. The corresponding single channel information signal 354 is processed by the FFE 902 that automatically adjusts its own impulse response through, for example, a least-squares algorithm, such as the Least Mean Squared (LMS) or the Recursive Least Squares (RLS) algorithms, that responds to the equalized single channel information signal 950.

The equalized single channel information signal 950 represents the combined signal and image, $s+i_0$, or the "primary input" as demonstrated in FIG. 9A. The image $i_1$, denoted as the reference residual signal 356 in FIG. 9B, is filtered to produce an output y, denoted as image canceler output 952 in FIG. 9B. The image canceler output 952 is subtracted from equalized single channel information signal 950 to produce an image corrected single channel information signal 954. The reference residual signal 356 is processed by the image canceler module 904 that automatically adjusts its own impulse response through, for example, a least-squares algorithm, such as the widely known Least Mean Squared (LMS) or Recursive Least Squares (RLS) algorithms, that responds to the image corrected single channel information signal 954 dependent on the image canceler output 952.

The DFE 908 produces the multi-channel information signal 152 by correcting for distortion caused by the communication channel 104 present the image corrected single channel information signal 954. During transmission, a propagation medium of the communication channel 104 may introduce distortion into the transmitted multi-channel information signal 156 causing the information-bearing signals within the received multi-channel information signal 158 to differ from the information-bearing signals within the transmitted multi-channel information signal 156. Noise, interference, signal strength variations known as fading, phase shift variations, or multiple path delays known as multi-path propagation may introduce distortion into the transmitted multi-channel information signal 156. The DFE 908 compensates for the distortion in the image corrected single channel information signal 954 to produce the multi-channel information signal 152. The corresponding image corrected single channel information signal 954 is processed by the DFE 908 that automatically adjusts its own impulse response through, for example, a least-squares algorithm, such as the widely known Least Mean Squared (LMS) or Recursive Least Squares (RLS) algorithms, that responds to the multi-channel information signal 152.

Figure 10:
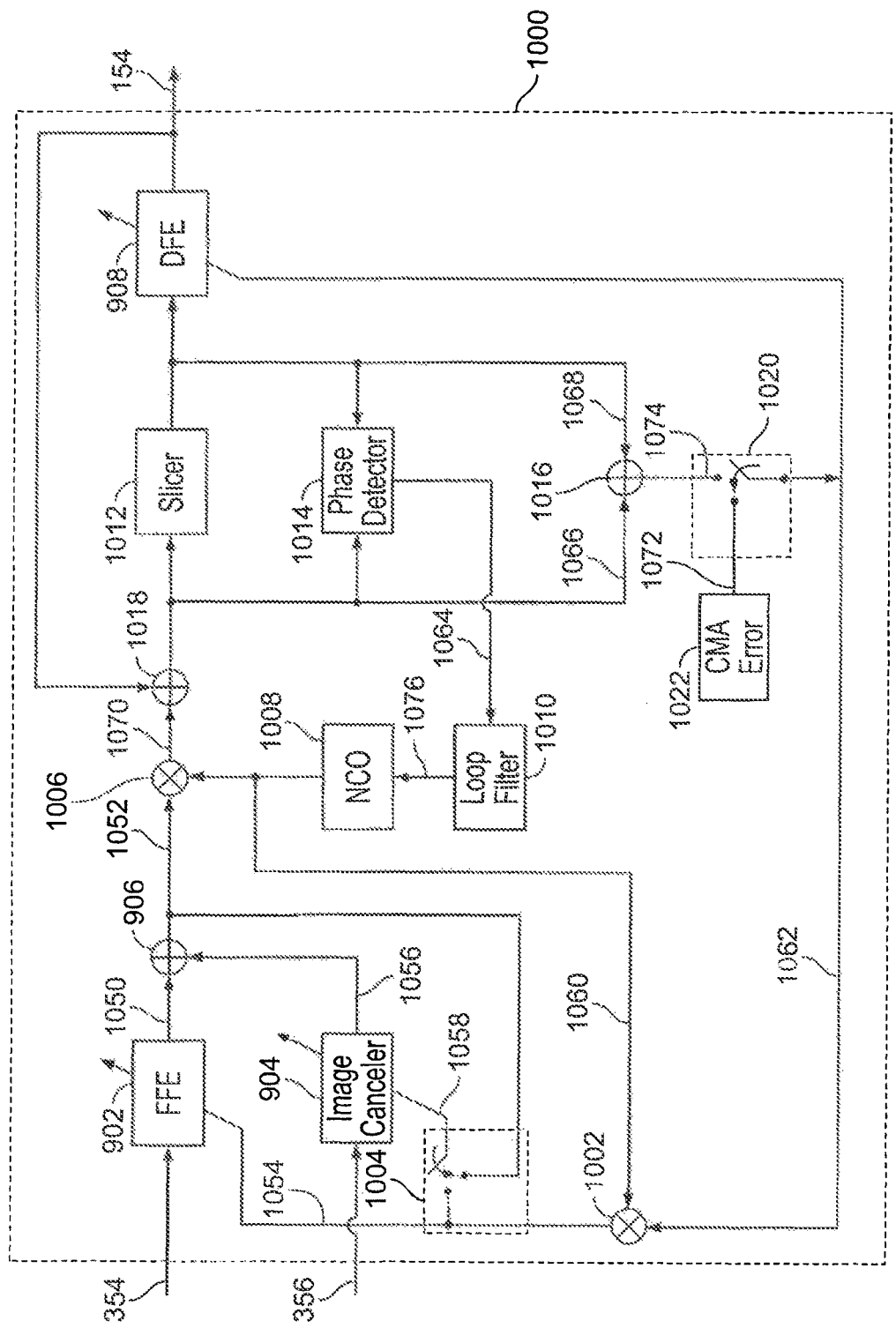
FIG. 10 is an illustration of an adaptive image canceler according to a further exemplary embodiment of the present invention.

FIG. 10 is an illustration of an adaptive image canceler according to a further exemplary embodiment of the present invention. An adaptive image canceler 1000 may be used to implement the image canceler 308.1 through 308.n as shown in FIG. 3A The adaptive image canceler 1000 removes or cancels the corresponding residual signal 356 as previously shown in FIG. 8A and FIG. 8B from the corresponding single channel information signal 354 to produce the multi-channel information signal 152. The adaptive image canceler 1000 includes the FFE 902, the image canceler module 904, the summer 906, the DFE 908, a multiplier 1002, a switch. 1004, a complex multiplier 1006, a numerically controlled oscillator (NCO) 1008, a loop filter 1010, a slicer 1012, a phase detector 1014, a summer 1016, a summer 1018, a switch 1020, and a constant modulus algorithm (CMA) error computation module 1022.

The FFE 902 produces an equalized single channel information signal 1050 by correcting for distortion caused by the communication channel 104 present in the single channel information signal 354. During transmission, a propagation medium of the communication channel 104 may introduce distortion into the transmitted multi-channel information signal 156 causing the information-bearing signals within the received multi-channel information signal 158 to differ from the information-bearing signals within the transmitted multi-channel information signal 156. Noise, interference, signal strength variations known as fading, phase shift variations, or multiple path delays known as multi-path propagation may introduce distortion into the transmitted multi-channel information signal 156. The FFE 902 compensates for this distortion in the single channel information signal 354 to produce the equalized single channel information signal 1050. The corresponding single channel information signal 354 is processed by the FFE 902 that automatically adjusts its own impulse response through, for example, a least-squares algorithm, such as the widely known Least Mean Squared (LMS) or Recursive Least Squares (RLS) algorithms, that responds to an image corrected equalized single channel information signal 1052 dependent on an equalized single channel information signal 1050.

The summer 906 combines the equalized single channel information signal 1050 with an image canceler output 1056 to produce the image corrected equalized single channel information signal 1052. The image corrected equalized single channel information signal 1052 includes substantially less interference and distortion caused by, but not limited to, the frequency-inverted duplicate or mirror image of a corresponding signal of interest 202.1 through 202.n, one or more neighboring information channels within the multi-channel information signal 152, or any other suitable source to provide some examples when compared to the single channel information signal 354.

A fine carrier correction loop determines the signal used by the NCO 1008 to ensure the image corrected baseband information channel 160 is substantially downconverted to baseband by multi-channel receiver 106. In other words, the fine carrier correction loop finely compensates for frequency offsets in the image corrected equalized single channel information signal 1052 by removing residual frequency offsets such as frequency offset of $\omega_t$ present in multi-channel receiver 106. The fine carrier correction loop of the adaptive image canceler 1000 includes the complex multiplier 1006, the NCO 1008, the loop filter 1010, the slicer 1012, the phase detector 1014, and the summer 1018.

The complex multiplier 1006 multiplies the image corrected equalized single channel information signal 1052 with a fine carrier frequency adjustment 1060 to produce a derotated image corrected signal 1070. In other words, a frequency offset resultant from either the multi-channel transmitter 102 and/or multi-channel receiver 106 may rotate constellation points in the constellation diagram of the single channel information signal 354. A constellation diagram is a representation of a digital modulation scheme in the complex plane. For example, the unknown phase offset in the equalized output for a 16-quadrature amplitude modulation (QAM) communication signal may rotate the sixteen constellation points an amount related to the unknown phase offset. The complex multiplier 1006 multiplies the symbol content of the an image corrected equalized single channel information signal 1052 by fine carrier frequency adjustment 1060 to rotate the constellation points in the constellation diagram in the opposite direction as the frequency offset.

The summer 1018 combines the derotated image corrected signal 1070 with the image corrected baseband information channel 160 to produce a soft decision 1066. The soft decision 1066 represents a downconverted representation of the received multi-channel information signal 158 that has undergone the process of image cancellation by the adaptive image canceler 1000. The information-bearing signals within the received multi-channel information signal 158 differs from the information-bearing signals within the transmitted multi-channel information signal 156 because of presence of noise in the communication channel 104, interference resulting from images created during the modulation and/or demodulation process to provide some examples. The slicer 1012 uses the soft decision 1066 to produce a hard decision 1068. More specifically, the slicer 1012 estimates the data content of the single channel information signal 354 based upon the soft decision 1066 according to a transfer function.

The phase detector 1014 generates a phase detector output 1064 that is proportional to the phase difference between the soft decision 1066 and the hard decision 1068. When the signal generated by the phase detector 1014 is approximately zero, the hard decision 1068 approximately equals the residual frequency offsets present in multi-channel receiver 106. The loop filter 1010 produces the loop filter output 1076 by integrating the phase detector output 1064. The loop filter output 1076 determines the frequency and phase of the signal generated by NCO 1008. The NCO 1008 generates the fine carrier frequency adjustment 1060 based upon the loop filter output 1076 to compensate for any fine carrier offset to ensure the single channel information signal 354 is converted to baseband at the input to the slicer 1012. In an exemplary embodiment, the NCO 1008 may be implemented using a Direct Digital Frequency Synthesizer (DDFS). In another exemplary embodiment, the fine carrier frequency adjustment 1060 may also be used by the DC bias and imbalance correction module 304 and/or digital front end 306 to remove residual frequency offsets such as frequency offset of a shown in FIG. 4 to provide an example.

The summer 1016 combines the soft decision 1066 with the hard decision 1068 to produce a least-squares error 1074. The switch 1020 coupled to the summer 1016 switches between the least-squares error 1074 and a CMA error 1074 to produce an adjustment signal 1062. The FFE 902, the image canceler module 904 when operating in a decision directed mode, and the DFE 908 may use the adjustment signal 1062 or a re-rotated least-squares error 1054 to automatically adjust their own impulse response according to a least-squares algorithm, such as the widely known Least Mean Squared (LMS) or Recursive Least Squares (RLS) algorithms. The multiplier 1002 multiplies the re-rotated least-squares error 1054 with the fine carrier frequency adjustment 1060 to produce the re-rotated least-squares error 1054. The least-squares algorithm updates adaptive coefficients within these modules to minimize the adjustment signal 1062 in the mean squared sense.

The image canceler module 904 may operate in a coarse acquisition mode, the decision directed mode, a constant modulus algorithm (CMA) mode of operation, and/or any combination of these modes. The switch 1004 switches between the coarse acquisition mode and the decision directed mode by switching an image canceler error 1058 between the re-rotated least-squares error 1054 and the image corrected equalized single channel information signal 1052. The image canceler module 904 operates in the coarse acquisition mode when the image corrected equalized single channel information signal 1052 is fed back to the image canceler module 904 via the switch 1004. In the coarse acquisition mode, the image canceler module 904 operates in a substantially similar manner as demonstrated in FIG. 9A. The coarse acquisition mode allows for the image canceler module 904 to automatically adjust its own impulse response through, for example, a least-squares algorithm, such as the widely known Least Mean Squared (LMS) or Recursive Least Squares (RLS) algorithms, for a larger frequency offset of $\omega_f$ as compared to the decision directed mode. On the other hand, the image canceler module 904 operates in the decision directed mode when the derotated re-rotated least-squares error 1054 is fed back to the image canceler module 904 via the switch 1004. A larger signal-to-noise ratio for multi-channel receiver 106 may be obtained by using the decision directed mode when compared against the coarse acquisition mode. When operating according to the constant modulus algorithm, the image canceler module 904, the switch couples the adjustment signal 1062 to the output of the CMA error computation module 1022, denoted as the CMA error 1074 in FIG. 10. The CMA is further described in detail in D. N. Godard, "Self-recovering equalization and carrier tracking in two-dimensional data communication systems," IEEE Transactions on Communications, vol 28, no. 11, pp. 1867-1875, November 1980 and/or J. R. Treicher, B. G. Agee, "A new approach to multipath correction of constant modulus signals," IEEE Transactions on Acoustics, Speech, and Signal Processing, vol. ASSP-31, no. 2. pp. 459-472, April, 1983, both of which are incorporated herein by reference in their entirety.

The adaptive image canceler 1000 may be fractionally spaced to substantially reduce aliasing. The simplest fractionally spaced structure is T/2 spacing, that is, 2 samples per symbol in the adaptive image canceler module 904. The FFE 902 does not need to be fractionally spaced. The adaptive image canceler 1000 may also be slightly fractionally spaced using, but not limited to, 8 T/9 spacing, 4 T/5 spacing, or any other suitable spacing to provide some examples.

Figure 11:
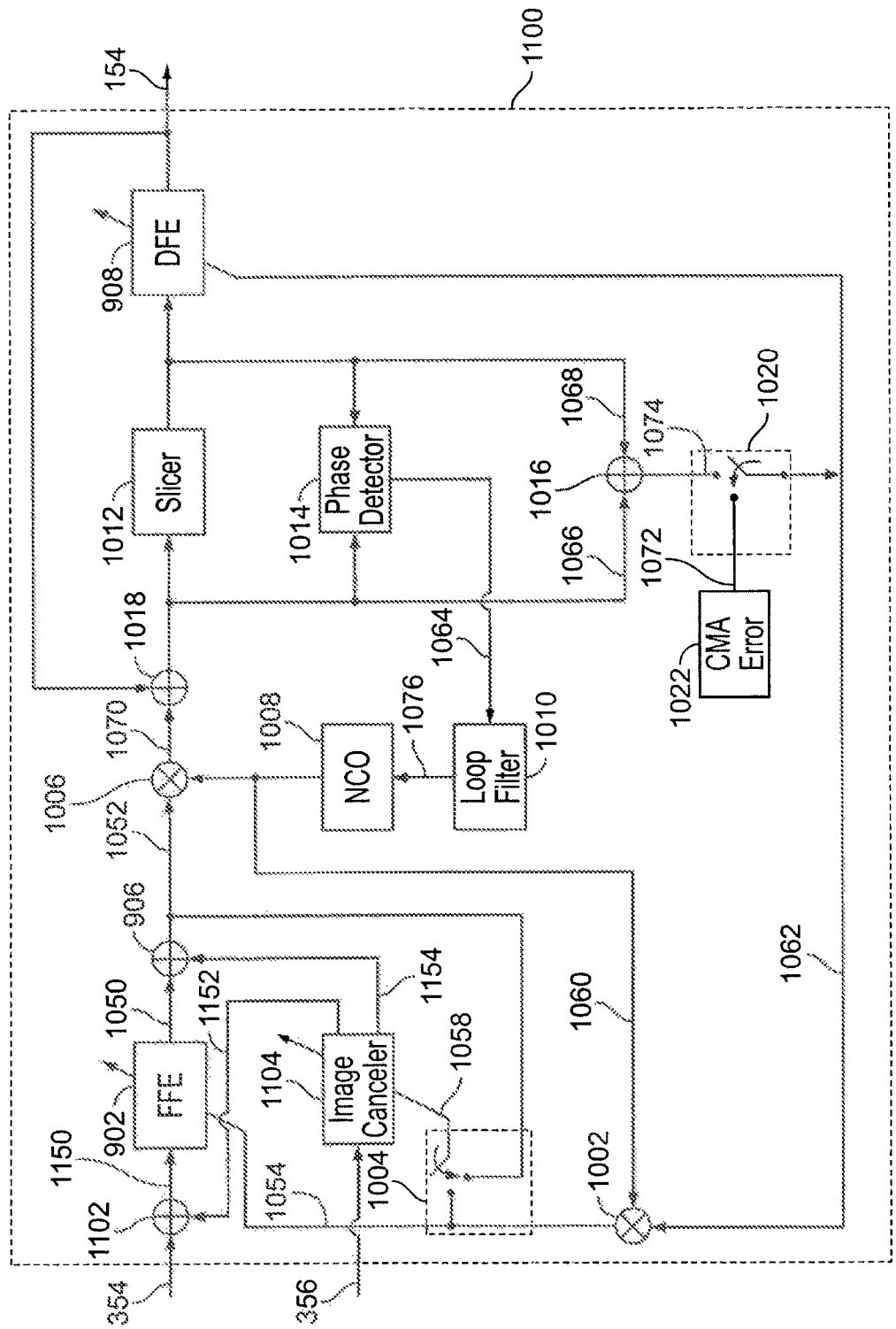
FIG. 11 is an illustration of an adaptive image canceler according to another exemplary embodiment of the present invention.

FIG. 11 is an illustration of an adaptive image canceler according to an additional exemplary embodiment of the present invention. An adaptive image canceler 1100 may be used to implement the image canceler 308.1 through 308.$n$ as shown in FIG. 3A. The adaptive image canceler 1100 removes or cancels the corresponding residual signal 356 as previously shown in FIG. 8A and FIG. 8B from the corresponding single channel information signal 354 to produce the multi-channel information signal 152.

The image canceler 1100 operates in a substantially similar manner as the image canceler 1100 except the image canceler 1100, contains a summer 1102 and an image canceler module 1104. The image canceler module 1104 operates in a substantially similar manner as the image canceler module 904 except the image canceler module 11.04 includes a first image canceler output 1152 and a second image canceler output 1154. The image canceler 1104 may use a first set of equalization coefficients to generate the first image canceler output 1152 and a second set of equalization coefficients to generate the second image canceler output 1154. Alternatively, the image canceler 1104 may use a first set of equalization taps to generate the first image canceler output 1152 and a second set of equalization taps to generate the second image canceler output 1154.

The summer 1102 combines the single channel information signal 354 with a first output 1152 of the image canceler module 1104 to produce a single channel information signal 1150. The single channel information signal 1150 includes substantially less interference and distortion caused by, but not limited to, the frequency-inverted duplicate or mirror image of a corresponding signal of interest 202 through 202.$n$, one or more neighboring information channels within the multi-channel information signal 152, or any Other suitable source to provide some examples when compared to the single channel information signal 354. The FFE 902 produces the equalized single channel information signal 1050 by correcting for remaining distortion caused by the communication channel 104 present in the single channel information signal 1150.

The summer 906 combines the equalized single channel information signal 1050 with the second image canceler output 1154 to produce the image corrected equalized single channel information signal 1052. In an exemplary embodiment, the summer 906 is optional. Fore this exemplary embodiment, the equalized single channel information signal 1050 is used as an input to the summer 1006 and for updating the image canceler module 1104 when operating in the coarse acquisition mode.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. An adaptive image canceler, comprising:
    a feed forward equalizer (FFE) configured to receive a communication signal, the communication signal including a signal of interest and an image of the signal of interest;
    an image canceler module configured to produce an output that is a substantially close replica of the image; and
    a summer module configured to combine an output of the FFE with the output of the image canceler module to substantially suppress the image from the communication signal.

2. The adaptive image canceler of claim 1, wherein the FFE is further configured to compensate for distortion present within the communication signal.

3. The adaptive image canceler of claim 1, wherein the image canceler module comprises:
   an adaptive filter, having multiple equalization taps, configured to adjust its impulse response by adjusting equalization coefficients corresponding to the multiple equalization taps.

4. The adaptive image canceler of claim 3, further comprising:
   a switch configured to select between a coarse acquisition mode of operation and a decision directed mode of operation,
   wherein the image canceler module is further configured to adjust the equalization coefficients based upon an output of the summer module in the coarse acquisition mode of operation, and
   wherein the image canceler module is further configured to adjust the equalization coefficients based upon an estimation of the signal of interest in the decision directed mode of operation.

5. The adaptive image canceler of claim 1, wherein the communication signal is a multi-channel communication signal having a plurality of information channels, and
   wherein the signal of interest occupies at least one information channel from among the plurality of information channels.

6. The adaptive image canceler of claim 1, wherein the image canceler module is further configured to receive an estimate of the image that is correlated with the image and uncorrelated with the signal of interest.

7. The adaptive image canceler of claim 6, wherein the image canceler module is further configured to filter the estimate of the image to produce the output that is a substantially close replica of the image.

8. The adaptive image canceler of claim 1, further comprising:
   a decision feedback equalizer (DFE) configured to receive an output of the summer module.

9. An adaptive image canceler, comprising:
   a feed forward equalizer (FFE) configured to receive a communication signal, the communication signal including a signal of interest and a residual signal, the communication signal being a multi-channel communication signal having a plurality of information channels, the signal of interest and the residual signal occupying at least one information channel from among the plurality of information channels;
   an image canceler module configured to produce an output that is a substantially close replica of the residual signal; and
   a summer module configured to combine an output of the FFE with the output of the image canceler module to substantially suppress the residual signal from the communication signal.

10. The adaptive image canceler of claim 9, wherein the residual signal is an image of the signal of interest, or one or more neighboring channels from among the plurality of information channels.

11. The adaptive image canceler of claim 9, wherein the FFE is further configured to compensate for distortion present within the communication signal.

12. The adaptive image canceler of claim 9, wherein the image canceler module comprises:
   an adaptive filter, having multiple equalization taps, configured to adjust its impulse response by adjusting equalization coefficients corresponding to the multiple equalization taps.

13. The adaptive image canceler of claim 12, further comprising:
   a switch configured to select between a coarse acquisition mode of operation and a decision directed mode of operation,
   wherein the image canceler module is further configured to adjust the equalization coefficients based upon an output of the summer module in the coarse acquisition mode of operation, and
   wherein the image canceler module is further configured to adjust the equalization coefficients based upon an estimation of the signal of interest in the decision directed mode of operation.

14. The adaptive image canceler of claim 9, wherein the communication signal is a multi-channel communication signal having a plurality of information channels, wherein the signal of interest occupies at least one information channel from among the plurality of information channels.

15. The adaptive image canceler of claim 9, wherein the image canceler module is further configured to filter the residual signal to produce the output that is a substantially close replica of the image.

16. The adaptive image canceler of claim 9, further comprising:
   a decision feedback equalizer (DFE) configured to receive an output of the summer module.

17. The adaptive image canceler of claim 9, wherein the output of the image canceler module is correlated with the residual signal and uncorrelated with the signal of interest.

18. A method for canceling images embedded onto a communication signal, comprising:
   compensating, by an adaptive image canceler, for distortion present within the communication signal to provide an equalized communication signal, the communication signal including a signal of interest and an image of the signal of interest;
   producing, by the adaptive image canceler, a correlated signal that is substantially correlated with the image and substantially uncorrelated with the signal of interest; and
   subtracting, by the adaptive image canceler, the correlated signal from the equalized communication signal to substantially suppress the image from the communication signal.

19. The method of claim 18, wherein the producing the correlated signal comprises:
   receiving, by the adaptive image canceler, a second image that is correlated with the image and uncorrelated with the signal of interest; and
   adaptively filtering, by the adaptive image canceler, the second image to provide the estimate.

20. The method of claim 18, wherein the adaptively filtering the second image comprises:
   adjusting, by the adaptive image canceler, equalization coefficients corresponding to multiple equalization taps of an adaptive filter; and
   filtering, by the adaptive image canceler, the second image using the adjusted equalization coefficients to adaptively filter the second image.

* * * * *